United States Patent
Chang et al.

(10) Patent No.: US 11,703,454 B2
(45) Date of Patent: Jul. 18, 2023

(54) METHOD AND APPARATUS FOR MULTIPLEXED IMAGING OF SPECTRALLY-SIMILAR FLUOROPHORES

(71) Applicant: Korea Advanced Institute of Science and Technology, Daejeon (KR)

(72) Inventors: Jae-Byum Chang, Daejeon (KR); Young-Gyu Yoon, Daejeon (KR); Junyoung Seo, Daejeon (KR); Yeonbo Sim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 125 days.

(21) Appl. No.: 17/132,628

(22) Filed: Dec. 23, 2020

(65) Prior Publication Data

US 2021/0208076 A1    Jul. 8, 2021

(30) Foreign Application Priority Data

Jan. 3, 2020  (KR) .................. 10-2020-0000976
Jul. 16, 2020 (KR) .................. 10-2020-0088091

(51) Int. Cl.
*G01N 21/64* (2006.01)
*G06T 7/00* (2017.01)

(52) U.S. Cl.
CPC ..... *G01N 21/6486* (2013.01); *G01N 21/6456* (2013.01); *G06T 7/0012* (2013.01); *G06T 2207/10064* (2013.01); *G06T 2207/30024* (2013.01)

(58) Field of Classification Search
CPC ............ G01N 21/6486; G01N 21/6456; G06T 7/0012
See application file for complete search history.

(56) References Cited

U.S. PATENT DOCUMENTS

| | | | |
|---|---|---|---|
| 6,055,325 A * | 4/2000 | Garini ................ | G06V 10/88 382/129 |
| 2003/0215791 A1* | 11/2003 | Garini ................ | B82Y 10/00 435/7.1 |

FOREIGN PATENT DOCUMENTS

| JP | 2015108549 A | 6/2015 |
|---|---|---|
| KR | 10-2016-0108316 A | 9/2016 |
| WO | 2005036143 A1 | 4/2005 |

* cited by examiner

*Primary Examiner* — Hugh Maupin
(74) *Attorney, Agent, or Firm* — Occhiuti & Rohlicek LLP

(57) ABSTRACT

Multiplexed fluorescent imaging which is essential for finding out how various biomolecules are spatially distributed in cells or tissues is disclosed. The present disclosure may obtain 10 or more different biomolecule images with one labeling and imaging by newly designing selection of fluorophores, detection spectral ranges, and signal unmixing algorithm. The present disclosure is a blind unmixing technology for unmixing an image without an emission spectrum of fluorophore, and in this technology, 4 pairs of fluorophores are used, and each pair consists of two fluorophores in which emission spectra are overlapped. Each pair of fluorophores is strongly excited by only one excitation laser. Two images with different detection spectral ranges are obtained for each pair, and two images are unmixed via mutual information minimization without fluorophore emission spectrum information. Two images also may be unmixed via Gram-Schmidt orthogonalization and fluorescence measurement based unmixing. This signal unmixing is repeated for each pair of fluorophores. Furthermore, a total of 10 or more fluorophores may be simultaneously used by adding two large stoke's shift fluorophores emitting light in wavelength ranges that does not overlap with the emission spectra of the above 8 fluorophores.

20 Claims, 20 Drawing Sheets

METHOD AND APPARATUS FOR MULTIPLEXED IMAGING OF SPECTRALLY-SIMILAR FLUOROPHORES

CROSS-REFERENCE TO RELATED APPLICATIONS

This application claims the priority benefit of Korean Patent Application No. 10-2020-0000976, filed on Jan. 3, 2020, and Korean Patent Application No. 10-2020-0088091, filed on Jul. 16, 2020, Korean Intellectual Property Office, the disclosure of which is incorporated herein by reference.

BACKGROUND

1. Field of the Invention

The following example embodiments relate to a method and apparatus for multiplexed imaging of spectrally-similar fluorophores.

2. Description of Related Art

Fluorescence imaging technique has been extensively used for decades to observe biological materials inside biological samples in biological research and medical diagnosis. The fluorescence imaging technique is that biological materials inside samples may be indirectly observed by imaging lights emitted from fluorophores after labeling the biological materials inside the samples with the fluorophores. The fluorophores are excited by absorbing lights and then emit lights, and at this time, it emits lights with a longer wavelength than the absorbed lights. For example, the fluorophores absorb lights of a particular wavelength range (e.g. 350-400 nm) and emit lights of a particular wavelength range (e.g. 400-600 nm). The degree of excitation of the fluorophores by each wavelength is called as an excitation spectrum, and the intensity of lights emitted by each wavelength is called as an emission spectrum.

SUMMARY

A problem to be solved is providing a method and apparatus for multiplexed imaging of biomaterials by using spectrally-similar fluorophores.

An operating method of an electronic apparatus according to the present disclosure may include obtaining at least one image for a plurality of fluorophores labeled to different biomolecules respectively, and unmixing the obtained images into images for each of the biomolecules, and at least two of the fluorophores may have similar emission spectra.

An electronic apparatus according to the present disclosure may include a memory, and a processor configured to connect with the memory, and execute at least one instruction stored in the memory, and the processor may be configured to obtain at least one image for a plurality of fluorophores labeled to different biomolecules respectively, and unmix the obtained image into images for each of the biomolecules, and at least two of the fluorophores may have similar emission spectra.

According to the present disclosure, image unmixing accuracy may be significantly improved, and the speed of multiplexed imaging may be increased.

According to the present disclosure, since 8 or more fluorophores (up to 10 implemented in the present disclosure) may be simultaneously observed at one staining, the time required to overall imaging may be reduced several times. The present disclosure may be combined with a multi-round staining technique, and in this case, the number of biomolecules that may be imaged at once increases 3 to 8 (or 10), so the number of staining round may be reduced by over three times. In case that the number of staining round increases, since there is a trouble of registering multiple images each other (image registration), there is a strength that as the number of staining round is reduced, the difficulty of overall imaging reduces, and because of the problem of image registration, the existing multi-round staining technique is difficult to obtain distribution of diverse molecules in three dimensions, but 10 biomolecules may be imaged in three dimensions without the image registration by using the present technology. According to the present disclosure, it is not based on an emission spectrum of a fluorophore, so no correction or calibration for each microscopy and for each sample is needed. Since the present disclosure needs only 8 emission filters for simultaneously imaging 10 fluorophores, it may be implemented with general confocal microscopy with band-pass filter or low-cost simple fluorescence microscopy.

According to the present disclosure, since it requires fewer images than ICA (independent component analysis) or NMF (non-negative matrix factorization) for simultaneously imaging the same number of fluorophores, the imaging time is reduced. Also, compared to ICA or NMF, since a small number of elements are inferred, the accuracy is much higher, so it is possible to unmix 8 or more fluorophores simultaneously with high accuracy in a tissue in which cells are densely concentrated. In case of additionally using two large stoke's shift fluorophores, it is possible to simultaneously image a total of 10 fluorophores. According to the present disclosure, since the number of fluorophores and the number of images to be obtained are the same, the imaging obtaining speed is fast, no spectral detector is required, and since the signal unmixing independently occurs for each pair of fluorophores, signal unmixing errors do not propagate to other fluorophore pairs, and since only one element is inferred from millions of pixels, the accuracy is much higher than that of the existing blind unmixing technology.

BRIEF DESCRIPTION OF THE DRAWINGS

These and/or other aspects, features, and advantages of the present disclosure will become apparent and more readily appreciated from the following description of embodiments, taken in conjunction with the accompanying drawings of which.

DETAILED DESCRIPTION

Figure 1A:
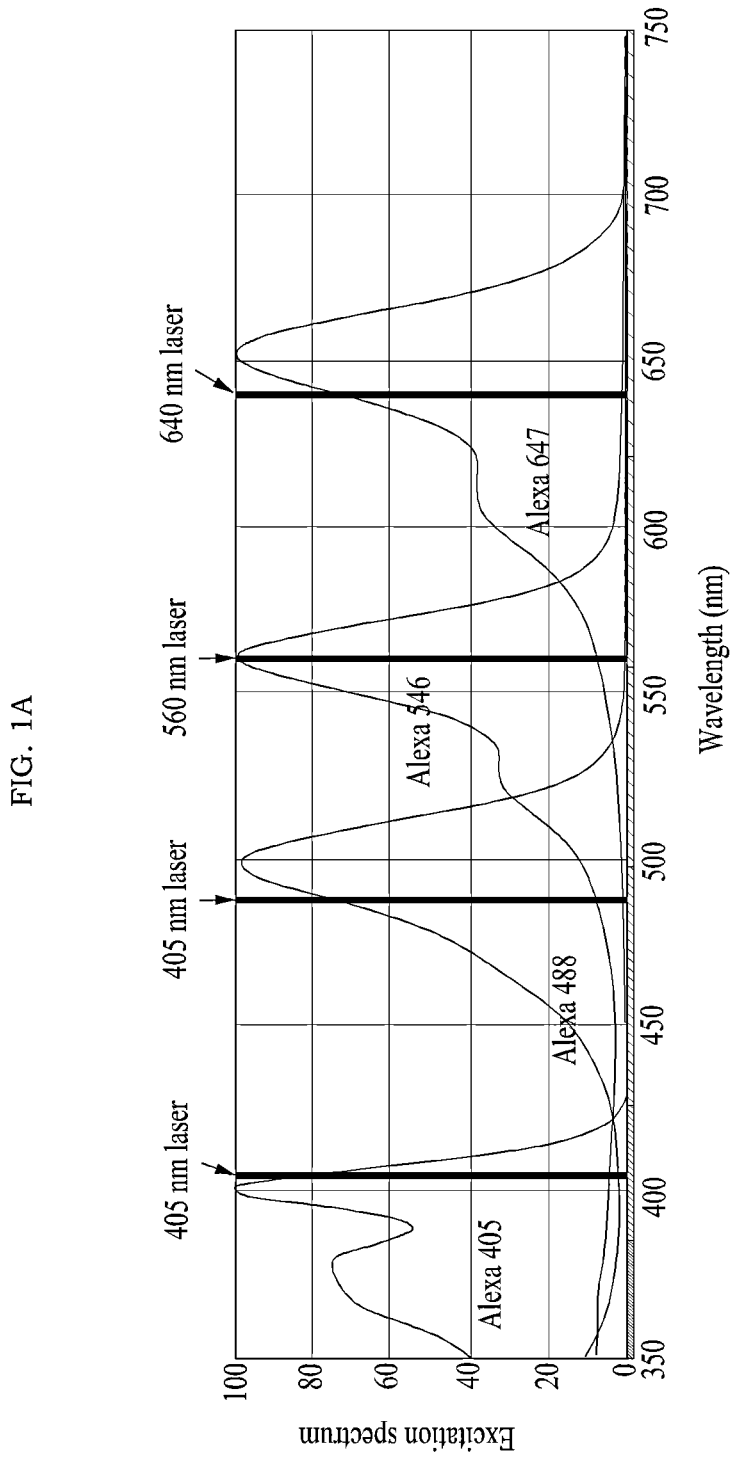
FIGS. 1A, 1B and 1C are an example of a fluorophore selection in multiplexed imaging using a general fluorophore.

Hereinafter, exemplary embodiments will be described in detail with reference to the accompanying drawings so that those skilled in the art may easily implement the embodiments. However, the present disclosure may be implemented in various different forms, and should not be limited to the embodiments described herein. In the drawings, parts irrelevant to the description are omitted in order to clearly describe the present disclosure, and similar reference numerals are used for the similar parts throughout the specification.

In the specification, when a part "comprises" a component, it means that other components may be further comprised rather than excluding other components unless specifically stated to the contrary. Also, terms such as "" . . . unit", " . . . machine", "module" and the like described in the specification mean units for processing at least one function or operation, and they may be implemented in hardware or software or a combination of hardware and software.

In the description, the operation subject may be omitted, but a method described in the present disclosure may be implemented in an electronic apparatus, e.g., an apparatus including a computing device and a fluorescence microscopy.

Generally, when labeling a biomolecule inside a biological sample with a fluorophore and imaging it with fluorescence microscopy, the process is as follows.

Light is emitted from a light source, and the light source may be a lamp emitting white light or a laser emitting light in a specific wavelength range or a LED. The light passes through an excitation filter penetrating only light in a desired wavelength range, and only light in the corresponding wavelength range passes. The light passed through the excitation filter is reflected by a dichroic mirror and rises up, and goes toward an objective of the microscopy. After this, it is illuminated to a sample through the objective.

Fluorophores inside the sample absorb light in the illuminated wavelength (e.g., 350-400 nm) and emit light in 400-700 nm wavelength range, and this light again passes through the objective and the dichroic mirror, and it is transmitted to an emission filter (the dichroic mirror has a characteristic for reflecting light in a specific wavelength range and passing the rest light).

At this time, besides the light emitted by the fluorophores from the sample, autofluorescence that the sample has itself is simultaneously emitted, and this autofluorescence has a characteristic of emitting in all over wide spectral range. Therefore, the light emitted from the sample is mixed with the light emitted by the fluorophores and the autofluorescence.

The light emitted from the sample passes through the emission filter penetrating only light in a specific spectral range, and by using the emission filter passing only 400~700 nm spectral range, among light emitted from the sample, light except 400~700 nm may be removed and only light in the spectral range may be penetrated. Instead of the emission filter, various types of devices which may selectively penetrate, reflect, or refract a specific spectral range and select only light in the specific spectral range may be used.

The light passed through the emission filter is sent to an eyepiece or a detector and represented to a digital image. As an example of the obtained fluorescence imaging, a specific protein (actin) in the sample (cultured cell) may be labeled with a fluorophore and then imaged with a fluorescence microscopy.

Figure 1B:
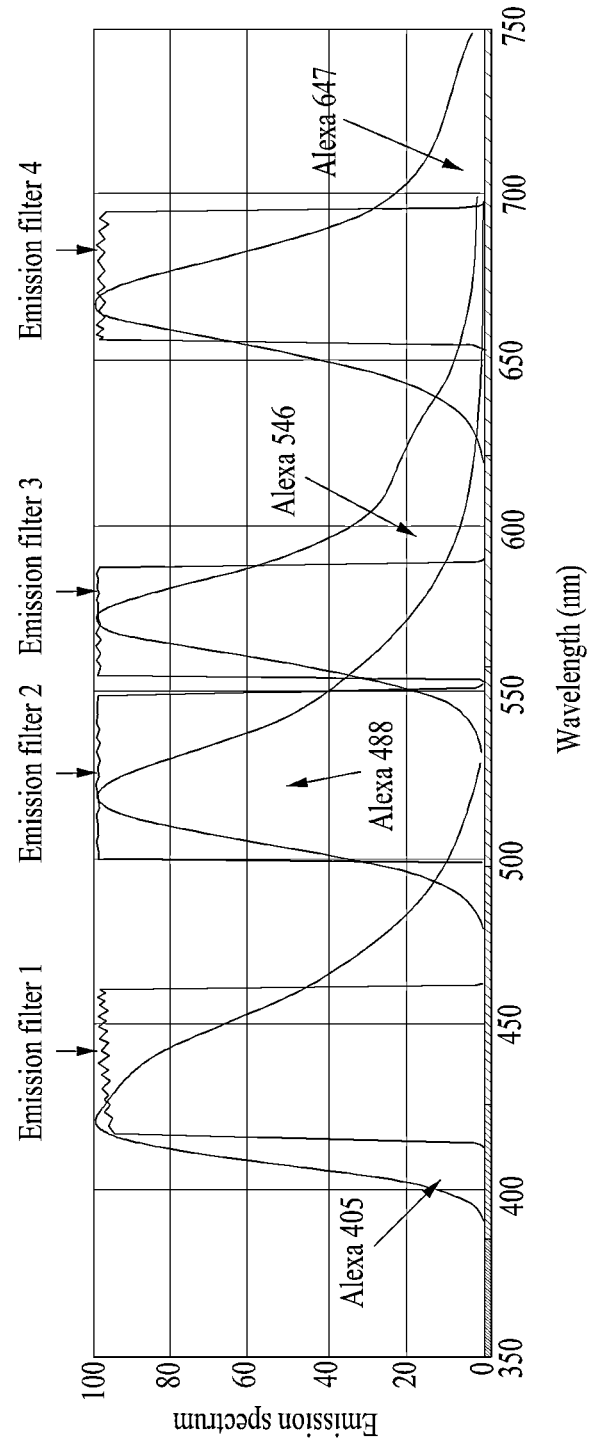
Figure 1C:
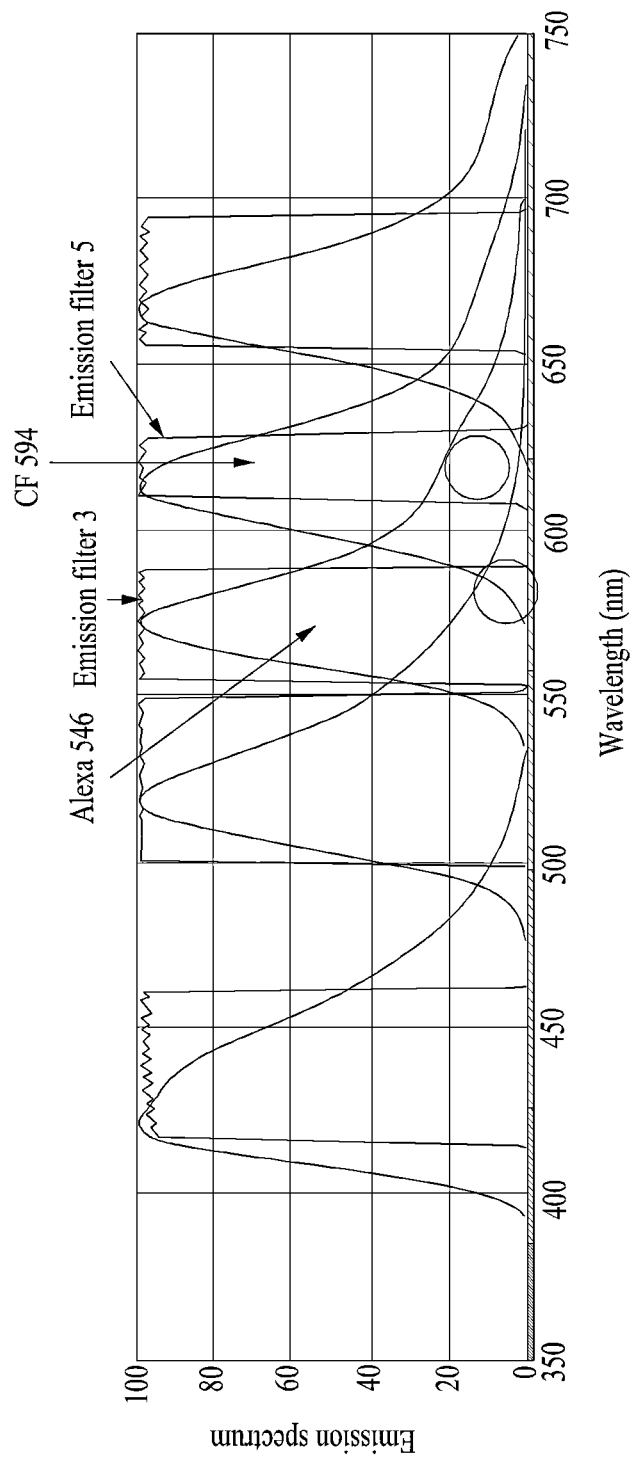

FIGS. 1A, 1B and 1C are an example of a fluorophore selection in multiplexed imaging using a general fluorophore. Referring to FIG. 1, to simultaneously observe several biomolecules in one sample, it is needed to label several biomolecules with different fluorophores and then selectively obtain an image of each of fluorophores. For this, a fluorophore in which an excitation spectrum and an emission spectrum are not overlapped should be used, and a fluorophore strongly excited in 405 nm, a fluorophore strongly excited in 488 nm, a fluorophore strongly excited in 560 nm, and a fluorophore strongly excited in 640 nm may be used as shown in FIG. 1A in order to simultaneously use up to 4 fluorophores by using a light source in 400-650 nm spectral range which is commonly used.

Referring to FIG. 1A, a fluorophore, Alexa 405, is strongly excited by only a 405 nm laser, and not excited by other lasers. Other fluorophores (Alexa 488, Alexa 546, and Alexa 647) are also strongly excited by one excitation laser. The four fluorophores are excited by each specific laser and emit lights with specific emission spectrum (solid curves) as shown in FIG. 1B.

Referring to FIG. 1B, the detection spectral ranges of the emission filter (solid rectangles) indicates wavelengths of light penetrated by each emission filter. The light emitted from the fluorophore is represented as a digital image through a detector after removing autofluorescence through the emission filter for each fluorophore.

To list the process for multiplexed imaging with four fluorophores, Alexa 405 is excited by illuminating a 405 nm laser to the sample, and light emitted from the fluorophore is filtered with an emission filter 1 and then imaged with a detector. Then, the 405 nm laser is turned off, Alexa 488 is excited by illuminating a 488 nm laser to the sample, and light emitted from the fluorophore is filtered with an emission filter 2 and then imaged with the detector. Afterward, the 488 nm laser is turned off, Alexa 546 is excited by illuminating a 560 nm laser to the sample, and light emitted from the fluorophore is filtered with an emission filter 3 and then imaged with the detector. Afterward, the 560 nm laser is turned off, Alexa 647 is excited by illuminating a 640 nm laser to the sample, and light emitted from the fluorophore is filtered with an emission filter 4 and then imaged with the detector.

As shown in FIG. 1B, the emission spectra of the fluorophores have 100 nm width, so 5 or more fluorophores may not be simultaneously used. When simultaneously using 5 fluorophores, emission spectra of the fluorophores start to be overlapped. For example, when additionally using CF 594 fluorophore as FIG. 1C, an emission spectrum of CF 594 fluorophore is located behind the emission spectrum of Alexa 546. The CF 594 fluorophore is strongly excited by the 560 nm laser like Alexa 546. Therefore, if two proteins inside the sample are labeled with each of Alexa 546 and CF 594 and the 560 nm laser is illuminated to them, two fluorophores strongly emit light. However, in this case, it is impossible to unmix two signals, and there is a problem that the signal of CF 594 is partially mixed (left circle) if using the emission filter 3 indicated in FIG. 1C, and the signal of Alexa 546 is partially mixed (right circle) if using the emission filter 5. Therefore, there is a limit that the current multiplexed imaging may simultaneously use up to 4 fluorophores, and 5 or more fluorophores may not be simultaneously used.

Recently, various attempts have been made to develop a more precise diagnostic method than the existing one by simultaneously acquiring and analyzing more biomolecular information from one sample according to the development of digital pathology. Also, in case of immunotherapy, a third generation anticancer drug, which has recently been in the spotlight, research results that reactivity for a specific medicine is different depending on what cell types are present inside the patient's cancer tissue and what types of immune cells are present have been reported. Therefore, there is a need for imaging simultaneously more biomolecules in one sample. However, in case of using a light source in 400~650 nm wavelength range commonly used, there is a limit that only up to 4 fluorophores may be simultaneously used at once. Various technologies have been developed to overcome the limitation, and the technologies may be divided into three (a multi-round staining, a spectral imaging and linear unmixing, and a blind unmixing).

First, the multi-round staining respectively labels biomolecules inside of a sample with 3 or 4 fluorophores and images them, and then, inactivates the fluorophores through chemical treatment or detaches the fluorophores from the biomolecules. Then, other biomolecules are labeled with the same 3 or 4 fluorophores and imaged. If the method is repeatedly performed, it is possible to simultaneously observe dozens of biomolecules in one biological sample. However, since fluorophore labeling should be repeated, it takes a long time, and there is a problem that the sample is damaged during a chemical treatment process.

Second, the spectral imaging and linear unmixing labels respectively various biomolecules with various fluorophores in which emission spectra are overlapped, and then, simultaneously excites the various fluorophores. Afterward, after obtaining images of a sample in various detection spectral ranges, the obtained images are unmixed into an image of each fluorophore based on information about the relative intensity of each fluorophore at each spectral range. For example, three biomolecules are respectively labeled with three fluorescent proteins (ECFP, EGFP, EYFP) in which emission spectra are overlapped, and then, images are obtained from 12 detection spectral ranges, and images of the three fluorophores may be unmixed from the 12 images. ECFP starts to emit light from 450 nm wavelength and emits light most strongly in 475 nm, EGFP starts to emit light from 470 nm and emits light most strongly in 510 nm, and EYFP starts to emit light from 500 nm and emits light most strongly in 530 nm. If the emission spectrum of each fluorophore is known, a total of 12 images are obtained from 12 wavelength ranges (from 1 to 12), and then, it is possible to unmix the images of three fluorophores based on the emission intensity by each fluorophore. When the process for unmixing the signals of three fluorophores is mathematically represented, it may be indicated as below [Equation 1] (it is supposed that resolution of the images obtained through the above process is 1024×1024 pixels).

$$\begin{bmatrix} IMG1_1 & \ldots & IMG1_{1,048,576} \\ IMG2_1 & \ldots & IMG2_{1,048,576} \\ IMG3_1 & \ldots & IMG3_{1,048,576} \\ IMG4_1 & \ldots & IMG4_{1,048,576} \\ IMG5_1 & \ldots & IMG5_{1,048,576} \\ IMG6_1 & \ldots & IMG6_{1,048,576} \\ IMG7_1 & \ldots & IMG7_{1,048,576} \\ IMG8_1 & \ldots & IMG8_{1,048,576} \\ IMG9_1 & \ldots & IMG9_{1,048,576} \\ IMG10_1 & \ldots & IMG10_{1,048,576} \\ IMG11_1 & \ldots & IMG11_{1,048,576} \\ IMG12_1 & \ldots & IMG12_{1,048,576} \end{bmatrix} = \begin{bmatrix} M_{1\_1} & M_{1\_2} & M_{1\_3} \\ M_{2\_1} & M_{2\_2} & M_{2\_3} \\ M_{3\_1} & M_{3\_2} & M_{3\_3} \\ M_{4\_1} & M_{4\_2} & M_{4\_3} \\ M_{5\_1} & M_{5\_2} & M_{5\_3} \\ M_{6\_1} & M_{6\_2} & M_{6\_3} \\ M_{7\_1} & M_{7\_2} & M_{7\_3} \\ M_{8\_1} & M_{8\_2} & M_{8\_3} \\ M_{9\_1} & M_{9\_2} & M_{9\_3} \\ M_{10\_1} & M_{10\_2} & M_{10\_3} \\ M_{11\_1} & M_{11\_2} & M_{11\_3} \\ M_{12\_1} & M_{12\_2} & M_{12\_3} \end{bmatrix} \times \quad \text{[Equation 1]}$$

$$\begin{bmatrix} F1_1 & \ldots & F1_{1,048,576} \\ F2_1 & \ldots & F2_{1,048,576} \\ F3_1 & \ldots & F3_{1,048,576} \end{bmatrix}$$

Left side matrix (IMG): Each row indicates an image (e.g.: IMG1, IMG2, . . . , IMG12) obtained from each fluorescence detection spectral range, and each column indicates an absolute brightness value by each pixel in each image (e.g.: $IMG1_1$ indicates an absolute brightness value of the first pixel of IMG1). In case that the resolution of the image is 1,024×1,024, the matrix IMG has a total of 1,048,576 (=1,024×1,024) columns.

Right side first matrix (M): Relative brightness in each detection spectral range of each fluorophore Right side second matrix (F): Each row of this matrix is an image composed of only each fluorophore, F1 means an image composed of signal of first fluorophore (ECFP), and each column indicates an absolute brightness value by each pixel like the matrix IMG IMG1, 2, 3, 4, . . . 12: Images obtained from different spectral ranges $IMG1_1$: First pixel value of IMG1

$IMG1_{1,048,576}$: Last pixel value of IMG1 (1,024×1,024=1,048,576)

F1, 2, 3: Images respectively composed of signals of each fluorophore (ECFP, EGFP, EYFP)

$F1_1$: First pixel value of F1

$F1_{1,048,576}$: Last pixel value of F1 (1,024×1,024=1,048,576)

Measured values: IMG matrix
Known values: M matrix
Values to find out: F matrix

Like this, when the intensity of each fluorophore in each detection spectral range is known, the spectral imaging and linear unmixing may obtain images from 12 detection spectral ranges, and obtain F matrix through IMG/M. In other words, this technique only works if the M matrix is known, but the M matrix is different depending on the microscopy and the chemical environment of the sample. The M matrix refers to the intensity by each detection spectral range of each fluorophore, and it may be different depending on optical characteristics inside the microscopy, sensitivity by each wavelength of the detector, and chemical composition in the sample. Therefore, since there is an inconvenience to separately measure the corresponding matrix for each microscopy and for each sample, it is not widely used for tissue imaging.

Third, the blind unmixing is a method for simultaneously inferring the M matrix and F matrix without knowing the M matrix, and for this, ICA (Independent Component Analysis) and NMF (Non-negative Matrix Factorization) have been used. However, as below [Equation 2], since the M matrix has 36 elements and the F matrix has 3,145,728 (=3×1,024×1,024) elements, it is very difficult to accurately infer three million elements simultaneously.

$$\begin{bmatrix} IMG1_1 & \ldots & IMG1_{1,048,576} \\ IMG2_1 & \ldots & IMG2_{1,048,576} \\ IMG3_1 & \ldots & IMG3_{1,048,576} \\ IMG4_1 & \ldots & IMG4_{1,048,576} \\ IMG5_1 & \ldots & IMG5_{1,048,576} \\ IMG6_1 & \ldots & IMG6_{1,048,576} \\ IMG7_1 & \ldots & IMG7_{1,048,576} \\ IMG8_1 & \ldots & IMG8_{1,048,576} \\ IMG9_1 & \ldots & IMG9_{1,048,576} \\ IMG10_1 & \ldots & IMG10_{1,048,576} \\ IMG11_1 & \ldots & IMG11_{1,048,576} \\ IMG12_1 & \ldots & IMG12_{1,048,576} \end{bmatrix} = \begin{bmatrix} M_{1\_1} & M_{1\_2} & M_{1\_3} \\ M_{2\_1} & M_{2\_2} & M_{2\_3} \\ M_{3\_1} & M_{3\_2} & M_{3\_3} \\ M_{4\_1} & M_{4\_2} & M_{4\_3} \\ M_{5\_1} & M_{5\_2} & M_{5\_3} \\ M_{6\_1} & M_{6\_2} & M_{6\_3} \\ M_{7\_1} & M_{7\_2} & M_{7\_3} \\ M_{8\_1} & M_{8\_2} & M_{8\_3} \\ M_{9\_1} & M_{9\_2} & M_{9\_3} \\ M_{10\_1} & M_{10\_2} & M_{10\_3} \\ M_{11\_1} & M_{11\_2} & M_{11\_3} \\ M_{12\_1} & M_{12\_2} & M_{12\_3} \end{bmatrix} \times \quad \text{[Equation 2]}$$

$$\begin{bmatrix} F1_1 & \ldots & F1_{1,048,576} \\ F2_1 & \ldots & F2_{1,048,576} \\ F3_1 & \ldots & F3_{1,048,576} \end{bmatrix}$$

Measured values: IMG matrix
Values to find out: M matrix and F matrix

As a result, the existing blind unmixing has been used very limitedly because of its poor accuracy. Also, the existing ICA and NMF have a condition that the number of images required for unmixing (the number of rows of the IMG matrix) must be greater than the number of fluorophores (the number of rows of the F matrix). In other words, since 9 or more images must be obtained to simultaneously image 8 fluorophores, there is a disadvantage that it takes a long time.

The present disclosure, PICASSO (Process of ultra-multiplexed Imaging of biomoleCules viA the unmixing of the Signals of Spectrally Overlapping fluorophores), solves the disadvantage of the conventional technology, and it is one of the blind unmixing. However, this technology may simultaneously image 8 fluorophores with only eight imaging with much higher accuracy than the existing blind unmixing techniques, and then, may unmix them. For this, the present disclosure includes fluorophore selection, selection of fluorescence detection spectral range, and fluorophore signal unmixing via mutual information minimization.

The present disclosure greatly improved image unmixing accuracy by significantly reducing the number of elements to be simultaneously inferred compared to the existing ICA or NMF based technologies through the above three strategies.

For example, in case of unmixing signals of two fluorophores, in which emission spectra are overlapped, with ICA or NMF, after imaging in at least three different spectral ranges as below [Equation 3], the M matrix and the F matrix should be simultaneously inferred by using ICA or NMF algorithms.

$$\begin{bmatrix} IMG1_1 & \ldots & IMG1_{1,048,576} \\ IMG2_1 & \ldots & IMG2_{1,048,576} \\ IMG3_1 & \ldots & IMG3_{1,048,576} \end{bmatrix} = \begin{bmatrix} M_{11} & M_{12} \\ M_{21} & M_{22} \\ M_{31} & M_{32} \end{bmatrix} \times \quad \text{[Equation 3]}$$

$$\begin{bmatrix} F1_1 & \ldots & F1_{1,048,576} \\ F2_1 & \ldots & F2_{1,048,576} \end{bmatrix}$$

However, the M matrix is composed of 6 elements, and the F matrix is composed of 2,097,152 elements, so the accuracy is declined because of more than 2 million elements should be simultaneously inferred (the numbers of right side matrices indicate elements to be inferred).

In contrast, in the present disclosure, the above problem may be simplified as below [Equation 4] through a strategy for fluorophore selection and a strategy for selection of fluorescent detection spectral range.

$$\begin{bmatrix} IMG1_1 & \ldots & IMG1_{1,048,576} \\ IMG2_1 & \ldots & IMG2_{1,048,576} \end{bmatrix} = \begin{bmatrix} 1 & 0 \\ \alpha & 1 \end{bmatrix} \times \quad \text{[Equation 4]}$$

$$\begin{bmatrix} F1_1 & \ldots & F1_{1,048,576} \\ F2_1 & \ldots & F2_{1,048,576} \end{bmatrix}$$

$$F1 - IMG1, \quad F2 - IMG2 - \alpha \times IMG1$$

As shown above, in the present disclosure, the relation of IMG1=F1 is established by allowing only F1 which is a signal of the first fluorophore to be included in an image IMG1 obtained in the first detection spectral range through the selection of fluorophore and fluorescent detection spectral range. IMG2 may be indicated in the sum of F1 and F2 (IMG2=F1×α+F2), and since F1 is the same with IMG1 which is the measured value, if only a is accurately inferred, F2 may be calculated (F2=IMG 2−α×IMG1). In the present disclosure, α value may be accurately inferred by using mutual information minimization between IMG1 and IMG2.

In other words, in the method using ICA or NMF, since millions of elements (M matrix and F matrix) should be simultaneously inferred by using ICA or NMF, the accuracy is declined, but in the present disclosure, the accuracy of image unmixing is dramatically improved by designing an experiment so that images may be unmixed by accurately inferring only one element (a) through the strategy for fluorophore selection and the strategy for selection of fluorescence detection spectral range, and α value may be inferred through the strategy for mutual information minimization.

In case of simultaneously imaging three or more fluorophores, instead of using three fluorophores in which emission spectra are overlapped each other, multiple pairs of fluorophores with overlapped emission spectra may be used. For example, when generally unmixing three fluorophores with overlapped emission spectra by using ICA or NMF, M matrix and F matrix should be simultaneously inferred by obtaining images in at least 4 spectral ranges.

$$\begin{bmatrix} IMG1_1 & \ldots & IMG1_{1,048,576} \\ IMG2_1 & \ldots & IMG2_{1,048,576} \\ IMG3_1 & \ldots & IMG3_{1,048,576} \\ IMG4_1 & \ldots & IMG4_{1,048,576} \end{bmatrix} = \quad \text{[Equation 5]}$$

$$\begin{bmatrix} M_{11} & M_{12} & M_{13} \\ M_{21} & M_{22} & M_{23} \\ M_{31} & M_{32} & M_{33} \\ M_{41} & M_{42} & M_{43} \end{bmatrix} \times \begin{bmatrix} F1_1 & \ldots & F1_{1,048,576} \\ F2_1 & \ldots & F2_{1,048,576} \\ F3_1 & \ldots & F3_{1,048,576} \end{bmatrix}$$

As above [Equation 5], it may be seen that the size of M matrix increases geometrically as the number of fluorophores with overlapped emission spectra increases, and in case of unmixing two fluorophores with overlapped emission spectra, the size of M matrix is 3×2=6, and in case of unmixing three fluorophores with overlapped emission spectra, the size of M matrix is 4×3=12. Like this, in case of unmixing N fluorophores with overlapped emission spectra, the size of M matrix increases as much as $N^2$, so the mathematical complexity rapidly increases when unmixing more fluorophores. For example, when a process for unmixing 8 fluorophores in which emission spectra are overlapped each other, with ICA or NMF is mathematically represented, it is like below [Equation 6].

$$\begin{bmatrix} IMG1_1 & \cdots & IMG1_{1,048,576} \\ IMG2_1 & \cdots & IMG2_{1,048,576} \\ IMG3_1 & \cdots & IMG3_{1,048,576} \\ IMG4_1 & \cdots & IMG4_{1,048,576} \\ IMG5_1 & \cdots & IMG5_{1,048,576} \\ IMG6_1 & \cdots & IMG6_{1,048,576} \\ IMG7_1 & \cdots & IMG7_{1,048,576} \\ IMG8_1 & \cdots & IMG8_{1,048,576} \\ IMG9_1 & \cdots & IMG9_{1,048,576} \end{bmatrix}$$ [Equation 6]

$$\begin{bmatrix} M_{11} & M_{12} & M_{13} & M_{14} & M_{15} & M_{16} & M_{17} & M_{18} \\ M_{21} & M_{22} & M_{23} & M_{24} & M_{25} & M_{26} & M_{27} & M_{28} \\ M_{31} & M_{32} & M_{33} & M_{34} & M_{35} & M_{36} & M_{37} & M_{38} \\ M_{41} & M_{42} & M_{43} & M_{44} & M_{45} & M_{46} & M_{47} & M_{48} \\ M_{51} & M_{52} & M_{53} & M_{54} & M_{55} & M_{56} & M_{57} & M_{58} \\ M_{61} & M_{62} & M_{63} & M_{64} & M_{65} & M_{66} & M_{67} & M_{68} \\ M_{71} & M_{72} & M_{73} & M_{74} & M_{75} & M_{76} & M_{77} & M_{78} \\ M_{81} & M_{82} & M_{83} & M_{84} & M_{85} & M_{86} & M_{87} & M_{88} \\ M_{91} & M_{92} & M_{93} & M_{94} & M_{95} & M_{96} & M_{97} & M_{98} \end{bmatrix} \times$$

$$\begin{bmatrix} F1_1 & \cdots & F1_{1,048,576} \\ F2_1 & \cdots & F2_{1,048,576} \\ F3_1 & \cdots & F3_{1,048,576} \\ F4_1 & \cdots & F4_{1,048,576} \\ F5_1 & \cdots & F5_{1,048,576} \\ F6_1 & \cdots & F6_{1,048,576} \\ F7_1 & \cdots & F7_{1,048,576} \\ F8_1 & \cdots & F8_{1,048,576} \end{bmatrix}$$

In the present disclosure, in order to avoid such problem, visible light area is divided into 4 areas, and in each area, only two fluorophores with overlapped spectra are used. The visible light area is divided into 405 nm area, 488 nm area, 560 nm area, and 640 nm area, and in each area, only two fluorophores with overlapped spectra are used. As a result, when simultaneously using a total of 8 fluorophores, it is represented as below [Equation 7].

$$\begin{bmatrix} IMG1_1 & \cdots & IMG1_{1,048,576} \\ IMG2_1 & \cdots & IMG2_{1,048,576} \end{bmatrix} = \begin{bmatrix} 1 & 0 \\ \alpha_{405} & 1 \end{bmatrix} \times \begin{bmatrix} F1_1 & \cdots & F1_{1,048,576} \\ F2_1 & \cdots & F2_{1,048,576} \end{bmatrix}$$

$$\begin{bmatrix} IMG3_1 & \cdots & IMG3_{1,048,576} \\ IMG4_1 & \cdots & IMG4_{1,048,576} \end{bmatrix} = \begin{bmatrix} 1 & 0 \\ \alpha_{400} & 1 \end{bmatrix} \times \begin{bmatrix} F3_1 & \cdots & F3_{1,048,576} \\ F4_1 & \cdots & F4_{1,048,576} \end{bmatrix}$$

$$\begin{bmatrix} IMG5_1 & \cdots & IMG5_{1,048,576} \\ IMG6_1 & \cdots & IMG6_{1,048,576} \end{bmatrix} = \begin{bmatrix} 1 & 0 \\ \alpha_{560} & 1 \end{bmatrix} \times \begin{bmatrix} F5_1 & \cdots & F5_{1,048,576} \\ F6_1 & \cdots & F6_{1,048,576} \end{bmatrix}$$

$$\begin{bmatrix} IMG7_1 & \cdots & IMG7_{1,048,576} \\ IMG8_1 & \cdots & IMG8_{1,048,576} \end{bmatrix} = \begin{bmatrix} 1 & 0 \\ \alpha_{640} & 1 \end{bmatrix} \times \begin{bmatrix} F7_1 & \cdots & F7_{1,048,576} \\ F8_1 & \cdots & F8_{1,048,576} \end{bmatrix}$$

[Equation 7]

Like this, the problem of simultaneously using 8 fluorophores and unmixing the signal may be simplified to the process for inferring the α value 4 times.

Figure 2:
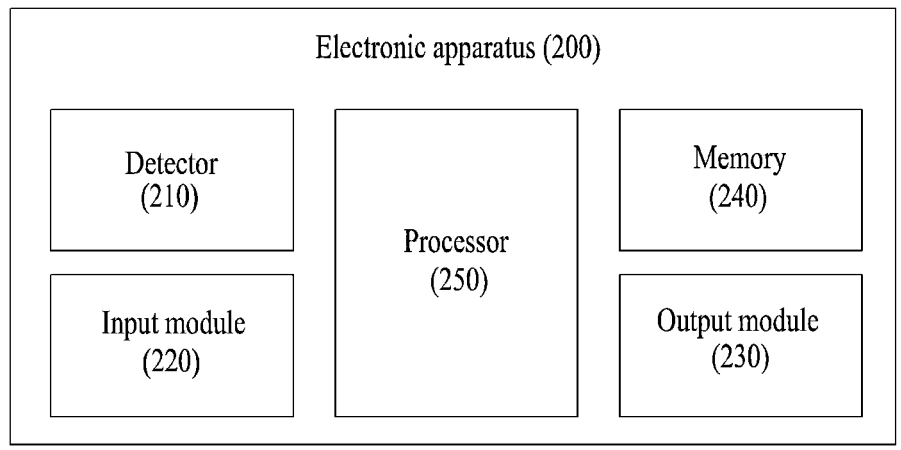
FIG. 2 is a block diagram of an electronic apparatus according to various example embodiments.

FIG. 2 is a block diagram of an electronic apparatus 200 according to various example embodiments.

Referring to FIG. 2, the electronic apparatus 200 according to various example embodiments may include at least one of a detector 210, an input module 220, an output module 230, a memory 240 or a processor 250. In some embodiments, at least one of the components of the electronic apparatus 200 may be omitted or at least one another component may be added to the electronic apparatus 200.

The detector 210 may photograph an image for a sample. At this time, the detector 210 may be installed at a predetermined location of the electronic apparatus 200, and photograph the image. For example, the detector 210 may include at least one of a sCMOS (scientific complementary metal-oxide-semiconductor) camera, a PMT (photo multiplier tube), or other equipment capable of measuring the intensity of light and representing it as an image.

The input module 220 may receive instruction or data to be used to at least one of the components of the electronic apparatus 200 from the outside of the electronic apparatus 200. At this time, the input module 220 may include at least one of an input device or a receiving device. For example, the input device may include at least one of a microphone, a mouse or a keyboard. In some embodiments, the input device may include at least one of a touch circuitry set to sense touch or a sensor circuitry set to measure force generated by touch. The receiving device may include at least one of a wireless receiving device or a wire receiving device.

The output module 230 may provide information to the outside of the electronic apparatus 200. At this time, the output module 230 may include at least one of a display device or a transmitting device. For example, the display device may include at least one of a display, a hologram device, or a projector. In some embodiments, the display device may be assembled with at least one of the touch circuitry or the sensor circuitry of the input module 220, and implemented in a touch screen. The transmitting device may include at least one of a wireless transmitting device or a wire transmitting device.

According to one example embodiment, the receiving device and the transmitting device may be combined in one communication module. The communication module may support communication between the electronic apparatus 200 and an external device (not shown). Such communication module may include at least one of a wireless communication module and a wire communication module. At this time, the wireless communication module may consist of at least one of the wireless receiving device or wireless transmitting device. In addition, the wireless communication module may support at least one of a near field communication method or a long distance communication method. The near field communication method may include at least one of Bluetooth, WiFi direct, or IrDA (infrared data association). The wireless communication module may communicate in the long distance communication method through a network, and the network may include at least one of a cellular network, the Internet, or a computer network such as LAN (local area network) or WAN (wide area network). Meanwhile, the wire communication module may consist of at least one of the wire receiving device or the wire transmitting device.

The memory 240 may store at least one of program or data used by at least one of the components of the electronic apparatus 200. For example, the memory 240 may include at least one of volatile memory or nonvolatile memory.

The processor 250 may control at least one of the components of the electronic apparatus 200 by executing the program of the memory 240, and perform a data process or operation. The processor 250 may be configured to obtain at least one image for a plurality of fluorophores respectively labeled to different biomolecules, and to unmix the obtained image to images for each of the biomolecules. At this time, at least two of the fluorophores may respectively indicate emission spectra in a similar spectral range. Also, each spectral range may include a first detection spectral range corresponding to a part of one of the emission spectra, and a second detection spectral range in which at least one part of one of the emission spectra and at least one part of another of the emission spectra are overlapped.

According to various example embodiments, the processor 250 may obtain a first image of the first detection spectral range, and obtain a second image of the second detection spectral range. At this time, the processor 250 may generate images for at least two emission spectra among fluorophores as light of wavelength range is illuminated to the fluorophores, and may obtain respectively the first image and the second image from the generated image. According to one example embodiment, the first image and the second image may be respectively obtained by a band-pass filter. According to another example embodiment, the first image and the second image may be respectively obtained by a spectral detector.

According to various example embodiments, the processor 250 may obtain a third image from the second image based on the first image. At this time, the processor 250 may obtain the third image by minimizing information shared between the first image and the second image from the second image. For example, the processor 250 may estimate ratio of brightness of one of the fluorophores in the second detection spectral range to brightness of one of the fluorophores in the first detection spectral range, and may obtain the third image from the second image based on the ratio. As one example, the processor 250 may be configured to obtain the third image by subtracting a result of multiplying the ratio and the first image from the second image.

Through this, the processor 250 may detect the first image as an image of one of the biomolecules, and detect the third image as an image of another of the biomolecules.

According to the present disclosure, the following advantages may be obtained compared to the existing multiplexed simultaneous imaging technology.

Compared to the multi-round staining, the present disclosure generally takes from an hour to several hours in sample staining, and since the present disclosure may simultaneously observe 8 or more fluorophores (up to 10 implemented in the present disclosure) at single staining, the overall imaging time may be reduced by several times. The present disclosure may be combined with the multi-round staining, an in this case, since the number of biomolecules which may be imaged at once increases three to eight (or ten), the number of staining round may be reduced by three times or more. In case that the number of staining round increases, since there is an inconvenience of having to register several images with each other (image registration), there is an advantage in that the difficulty of the overall imaging decreases as the number of staining round decreases.

Because of the problem of the above image registration, the existing multi-round staining is difficult to obtain a distribution of diverse molecules in three dimensions, but when using the present disclosure, it may obtain a distribution of 10 biomolecules in three dimensional without the image registration.

Compared to the spectral imaging and linear unmixing, since the present disclosure is not based on the emission spectrum of the fluorophore, no correction or calibration for each microscopy and for each sample is needed. In general, a spectral detector which is expensive equipment should be used for spectral imaging, but general biology laboratories and hospitals do not have microscopy equipped with the spectral detector. Since the present disclosure needs only 8 emission filters for simultaneously imaging 10 fluorophores, it may be implemented with general confocal microscopy or low cost simple fluorescence microscopy.

Compared to the blind unmixing, the present disclosure requires fewer images than ICA or NMF for simultaneously imaging the same fluorophores, the imaging time is reduced. Also, since a small number of elements need to be inferred compared to ICA or NMF, the accuracy is much higher, so it is possible to unmix 8 or more fluorophores simultaneously with high accuracy in a tissue in which cells are densely concentrated. In case of additionally using two large stoke's shift fluorophores, it is possible to simultaneously image a total of 10 fluorophores.

Figure 3:
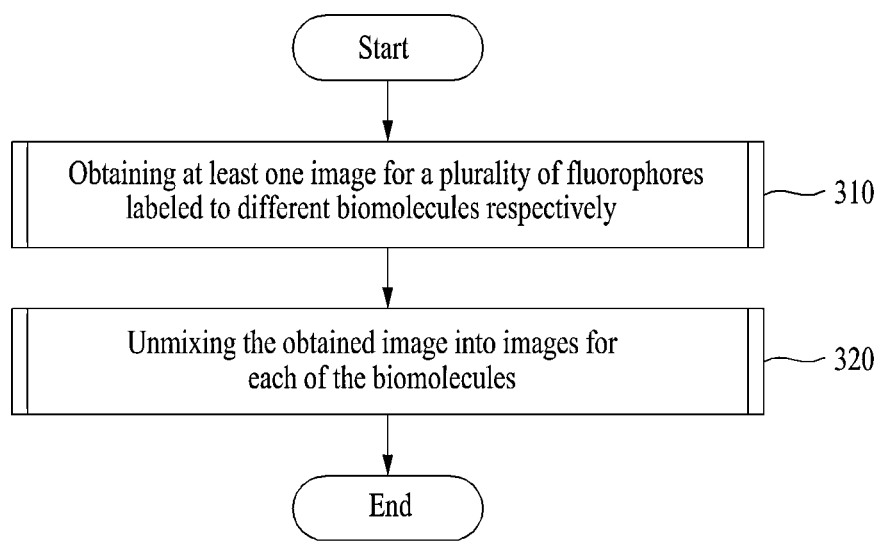
FIG. 3 is a flow chart of a method for multiplexed imaging of an electronic apparatus according to various example embodiments.
Figure 4A:
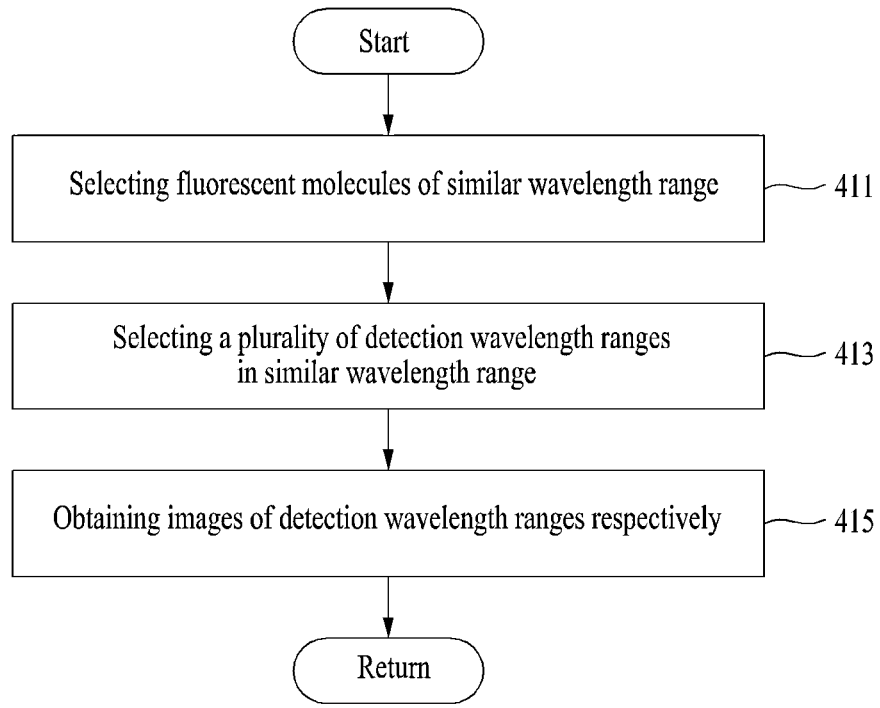
FIG. 4A is a flow chart of obtaining images of FIG. 3.
Figure 4B:
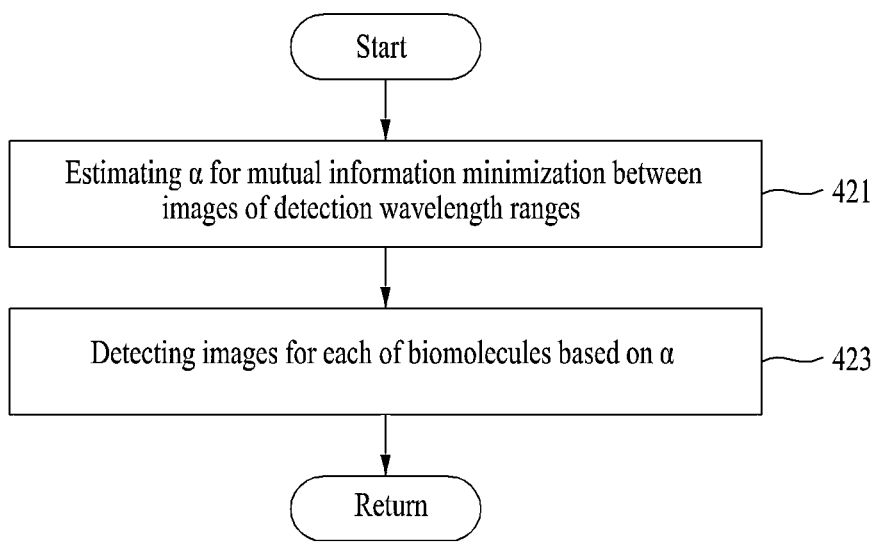
FIG. 4B is a flow chart of unmixing images of FIG. 3.
Figure 5:
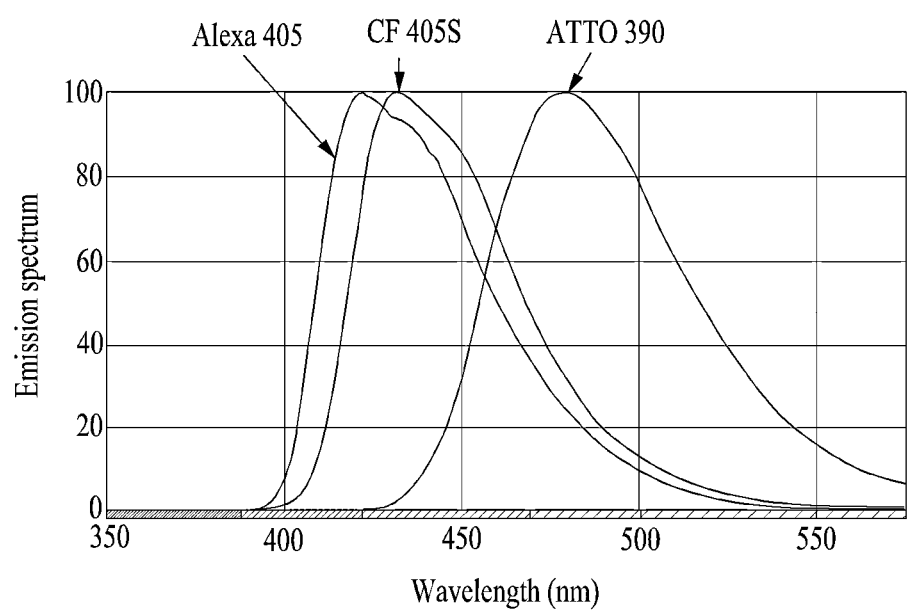
FIG. 5 is a drawing for describing a method for selecting a fluorophore according to an example of embodiments.
Figure 6:
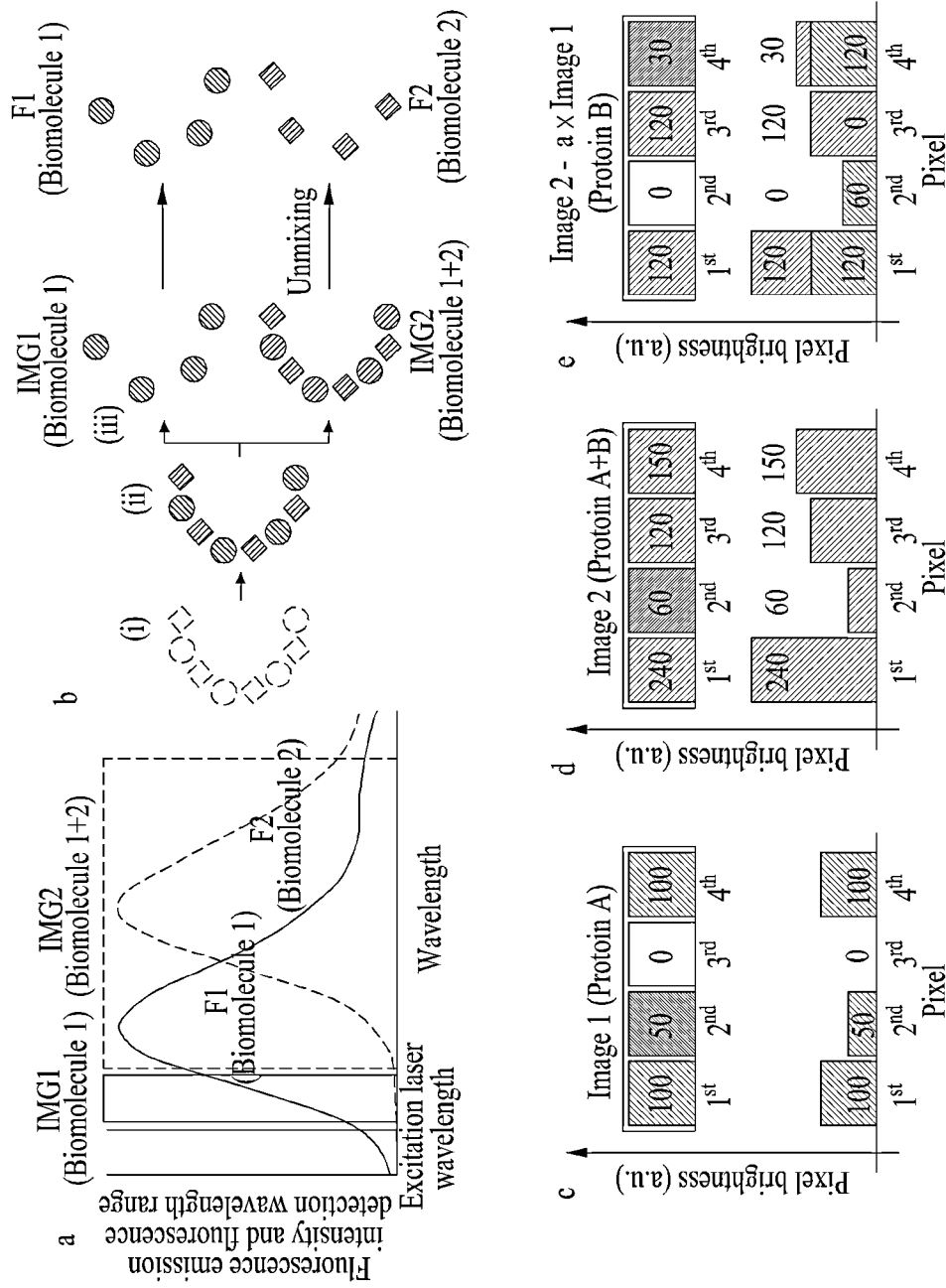
FIG. 6 is a drawing for describing a method for multiplexed imaging according to an example of embodiments.

FIG. 3 is a flow chart of a method for multiplexed imaging of the electronic apparatus 200 according to various example embodiments. FIG. 4A is a flow chart of obtaining images of FIG. 3, and FIG. 4B is a flow chart of unmixing images of FIG. 3. FIG. 5 is a drawing for describing a method for selecting a fluorophore according to an example of embodiments. FIG. 6 is a drawing for describing a method for multiplexed imaging according to an example of embodiments.

Referring to FIG. 3, the electronic apparatus 200 may obtain at least one image for a plurality of fluorophores in Step 310. At this time, the plurality of fluorophores may be labeled to different biomolecules respectively. This will be described later in more detail with reference to FIG. 4A.

Referring to FIG. 4A, the electronic apparatus 200 may select a fluorophore in each spectral range in Operation 411. Through this, at least two of the fluorophores may respectively indicate emission spectra in a similar spectral range. For this, at least two fluorophores may be selected from the present existing numerous fluorophores or fluorophores to be newly synthesized in the future according to the strategy for selecting a fluorophore of the present disclosure.

In the present disclosure, 4 excitation lasers in 400-650 nm spectral range which is a commonly used visible light area are used, and a list of fluorophores strongly excited by only one excitation laser of the 4 excitation lasers is made. For example, since CF405S and ATTO390 are strongly excited by only 405-nm excitation laser of the 4 excitation lasers, they may be used, but since CF440 may be excited by 405 nm laser and 488 nm excitation laser, it may be not included in the list.

Two fluorophores in which emission spectra are not overlapped as much as may be selected, but two fluorophores that differ by more than a reference value may be selected. From the list of fluorophores by each excitation laser, two fluorophores in which the emission maxima by each laser differs by more than a reference value may be selected.

In FIG. 5, regarding a method for selecting a fluorophore of 405 nm excitation laser, three fluorophores, Alexa 405, CF405S, and ATTO390, are strongly excited by 405-nm laser, and not excited by other lasers. Alexa 405 and CF405S have a difference of 10 nm in wavelength at which the emission spectrum is maximized, but for CF405S and ATTO390, the wavelength at which the emission spectrum is maximized is more than 50 nm apart. Therefore, in the present disclosure, it may select CF405S and ATTO390 (it is possible to select Alexa 405 and ATTO390 or Alexa 405 and CF405S). The example of fluorophore pair by each excitation laser selected by the above condition is as below [Table 1].

TABLE 1

| Laser | Fluorophore pair |
| --- | --- |
| 405-nm laser | CF405S, ATTO390 |
| 488-nm laser | CF488A, ATT0514 |
| 560-nm laser | CF568, ATTORho101 |
| 640-nm laser | CF633, CF660R |

In 405-nm laser and 488-nm laser, two large-stoke's shift fluorophores (CF405L, ATTO490LS) may be additionally used. The large-stoke's shift fluorophore means a fluorophore showing a large difference of about 100 nm between the excitation maximum and the emission maximum, and because of this characteristic, it may be simultaneously used with above 8 fluorophores. The large-stoke's shift fluorophore which may be excited by 560-nm excitation laser and 640-nm excitation laser may be simultaneously used, and in this case, it is possible to simultaneously use a total of 12 fluorophores.

The electronic apparatus 200 may select a plurality of detection spectral ranges in each spectral range in Step 413.

At this time, as shown in FIG. 6a, each detection spectral range may include a first detection spectral range corresponding to a part of one of emission spectra, and a second detection spectral range in which at least one part of one of the emission spectra and at least one part of another of the emission spectra are overlapped. In this case, the electronic apparatus 200 may select the first detection spectral range in order to detect only a signal of the first fluorophore of fluorophores corresponding to each wavelength range. FIG. 6a is an emission spectrum (solid an dotted curves) of two fluorophores in which the used emission spectra are overlapped and two detection spectral ranges (solid and dotted rectangles).

The electronic apparatus 200 may respectively obtain images of detection spectral ranges in Step 415. At this time, the electronic apparatus 200 may obtain the first image of the first detection spectral range, and may obtain the second image of the second detection spectral range. Through this, the electronic apparatus 200 may obtain the first image for one of the fluorophores with the similar spectral range, and may obtain the second image for all fluorophores with the similar spectral range. After this, the electronic apparatus 200 may return to FIG. 3, and proceed with Step 320.

According to one example embodiment, 4 pairs of fluorophores are used, and each pair of fluorophores in which the emission spectra are overlapped is strongly excited by one of 4 standard excitation lasers (405, 488, 560, 640 nm). Therefore, since only signals of two fluorophores need to be unmixed for each excitation laser, the process is simpler compared to the case of unmixing signals of several fluorophores in which the emission spectra are overlapped.

After labeling two biomolecules inside of the sample with two fluorophores respectively, if 405-nm laser is illuminated to them, the first fluorophore (solid curve) and the second fluorophore (dotted curve) in FIG. 6a simultaneously emit light. Since an image, IMG1, obtained by filtering the light with a band-pass filter passing the first detection spectral range indicated by solid rectangle includes only the signal of the first fluorophore, the relation of IMG1=F1 is established. Then, an image, IMG2, obtained by filtering light emitted from the sample with a band-pass filter passing the second detection spectral range indicated by dotted rectangle includes both signal of the first fluorophore and signal of the second fluorophore. After labeling the two biomolecules inside of the biological tissue with two fluorophores respectively, two images are obtained from two detection spectral ranges. At this time, the image may be obtained from each detection spectral range by using a spectral detector, and a band-pass filter may be used. First, the first detection spectral range is the front spectral range of the emission spectrum of the first fluorophore, and the image, IMG1, obtained from this spectral range includes only signal of the first fluorophore (F1). The second spectral range is a spectral range in which signals of the two fluorophores are detected, and the image, IMG2, obtained from this spectral range includes both signal of the first fluorophore (F1) and signal of the second fluorophore (F2). Therefore, the relation between IMG1, IMG2, F1, and F2 indicated in FIG. 6a is as below [Equation 8].

$$\begin{bmatrix} IMG1_1 & \ldots & IMG1_{1,048,576} \\ IMG2_1 & \ldots & IMG2_{1,048,576} \end{bmatrix} = \begin{bmatrix} 1 & 0 \\ \alpha & 1 \end{bmatrix} \times \begin{bmatrix} F1_1 & \ldots & F1_{1,048,576} \\ F2_1 & \ldots & F2_{1,048,576} \end{bmatrix}$$
$$F1 = IMG1, \quad F2 = IMG2 - \alpha \times IMG1$$

[Equation 8]

The $\alpha$ is ratio of brightness in the second spectral range to brightness in the first spectral range of the first fluorophore. As shown in above [Equation 8], if only this $\alpha$ value is accurately estimated, F2 may be calculated by completely removing the signal of F1(=IMG1) from IMG2. Here, in FIG. 6a, the $\alpha$ is 'area of solid curve included in dotted rectangle/area of solid curve included in solid rectangle'.

Referring to FIG. 3 again, the electronic apparatus 200 may unmix the images obtained in Step 320 into images for each of the biomolecules. This will be described below in more detail with reference to FIG. 4B.

Referring to FIG. 4B, the electronic apparatus 200 may infer $\alpha$ for MI minimization (mutual information minimization) between the images obtained from the detection spectral ranges in Step 421. At this time, the electronic apparatus 200 may infer the $\alpha$ based on the first and second images.

To infer the $\alpha$ value, MI minimization may be used. The MI is amount of information shared between two variables, and the MI of the two independent random variables is 0. If F1 is completely removed from IMG2, it is supposed that the resulting (IMG2−α×F1) and IMG1 become independent variables each other, and the MI is minimized. Therefore, the α value which may minimize the MI between IMG1 and (IMG2−α×F1), and from this value, F2 is calculated. Since this method finds one variable α from IMG1 and IMG2 having millions of pixel values, it has very high accuracy compared to the existing blind unmixing techniques. Also, in the present disclosure, as two additional methods for finding the α, fluorescence measurement based unmixing by directly measuring M matrix and Gram-Schmidt orthogonalization which is another blind unmixing method may be used.

The electronic apparatus 200 may detect images for each of the biomolecules based on the α in Step 423. At this time, the electronic apparatus 200 may obtain a third image from the second image based on the α. Here, the electronic apparatus 200 may obtain the third image by subtracting a result of multiplying the α and the first image from the second image. Through this, the information shared between the first image and the second image may be minimized from the second image, and hereby, the third image may be obtained. Accordingly, the first image may be detected as an image of one of the biomolecules, and the third image may be detected as an image of another of the biomolecules.

FIG. 6b is an image before and after unmixing when imaging two biomolecules labeled with two fluorophores in which the emission spectra are overlapped with two different detection spectral ranges as FIG. 6a.

FIG. 6c-e is an example of signal unmixing for an image consisting of 4 pixels (top line), and the α is supposed to be 1.2. The number in the rectangle is absolute brightness of each pixel. c image obtained from the first detection spectral range. d image obtained from the second detection spectral range. e image for second fluorophore after unmixing. After multiplying the α (1.2) found via the MI minimization and the image obtained from the first detection spectral range, and this value is subtracted from the image obtained from the second detection spectral range. For example, as FIG. 6a, the solid and dotted curves are the emission spectra of two fluorophores, and the solid and dotted rectangles indicate two fluorescence detection spectral ranges.

By using the above method, the method for simultaneously imaging 8 fluorophores by 4 excitation lasers (405, 488, 560, and 640 nm), and unmixing the signals may be represented as below [Equation 9].

$$\begin{bmatrix} IMG1_1 & \ldots & IMG1_{1,048,576} \\ IMG2_1 & \ldots & IMG2_{1,048,576} \end{bmatrix} = \begin{bmatrix} 1 & 0 \\ \alpha_{405} & 1 \end{bmatrix} \times \begin{bmatrix} F1_1 & \ldots & F1_{1,048,576} \\ F2_1 & \ldots & F2_{1,048,576} \end{bmatrix}$$

$$\begin{bmatrix} IMG3_1 & \ldots & IMG3_{1,048,576} \\ IMG4_1 & \ldots & IMG4_{1,048,576} \end{bmatrix} = \begin{bmatrix} 1 & 0 \\ \alpha_{488} & 1 \end{bmatrix} \times \begin{bmatrix} F3_1 & \ldots & F3_{1,048,576} \\ F4_1 & \ldots & F4_{1,048,576} \end{bmatrix}$$

$$\begin{bmatrix} IMG5_1 & \ldots & IMG5_{1,048,576} \\ IMG6_1 & \ldots & IMG6_{1,048,576} \end{bmatrix} = \begin{bmatrix} 1 & 0 \\ \alpha_{560} & 1 \end{bmatrix} \times \begin{bmatrix} F5_1 & \ldots & F5_{1,048,576} \\ F6_1 & \ldots & F6_{1,048,576} \end{bmatrix}$$

$$\begin{bmatrix} IMG7_1 & \ldots & IMG7_{1,048,576} \\ IMG8_1 & \ldots & IMG8_{1,048,576} \end{bmatrix} = \begin{bmatrix} 1 & 0 \\ \alpha_{640} & 1 \end{bmatrix} \times \begin{bmatrix} F7_1 & \ldots & F7_{1,048,576} \\ F8_1 & \ldots & F8_{1,048,576} \end{bmatrix}$$

[Equation 9]

As shown in above [Equation 9], the process for simultaneously using 8 fluorophores and unmixing the signals is simplified as the process for inferring one variable α for each wavelength four times. Also, there is an advantage that if an error occurs in inferring one α, this error does not affect the fluorophores in other spectral ranges, and only affects one fluorophore in the same spectral range (e.g., if an error occurs in inferring $a_{405}$, only F2 is inaccurate, and F1 and F3-8 are not affected). In the present disclosure, in addition to the above 8 fluorophores, two large stoke's shift fluorophores showing large difference in excitation spectrum and emission spectrum are additionally used. Through this, it succeeds to simultaneously use 10 fluorophores with 4 standard excitation lasers. When additionally using the additional two large-stoke's shift fluorophores which may be strongly excited by 560-nm and 640-nm lasers, it is possible to simultaneously use a total of 12 fluorophores.

FIG. 6b shows the process for labeling the two biomolecules inside of the biological sample with two fluorophores in which emission spectra are overlapped, obtaining IMG1 and IMG2 from the two fluorescence detection spectral ranges, and unmixing the images F1 and F2 of the two biomolecules. As shown in FIG. 6b, after labeling the two biomolecules inside of the biological tissue (dotted rectangles and dotted circles) with the two fluorophores, if two images are obtained from the two fluorescence detection spectral ranges indicated in FIG. 6a, IMG1 becomes an image showing circular protein, and IMG2 shows all circular and rectangular biomolecules.

The α is calculated by applying the MI minimization to the obtained two images IMG1(=F1) and IMG2, and by using this, F2 is unmixed from IMG2. The final results, F1 and F2, are images of circular and rectangular biomolecules, respectively.

For the unmixing two images, the α is inferred from IMG1(=F1) and IMG2 through MI minimization (mutual information minimization).

The MI is α value based on information theory, and the MI between two variables means the total amount of information shared by two variables. Therefore, the MI of two random variables is 0.

Since a digital image is a discrete variable, it may calculate the MI between two images by using the below equation. In the below [Equation 10], $p_X(x)$ and $p_Y(y)$ correspond to probability distribution function (or histogram) of each image, and $p_{(X,Y)}(x,y)$ corresponds to joint distribution function of two images (or joint histogram).

$$I(X;Y) = \sum_y \sum_x p_{(X,Y)}(x,y) \log\left(\frac{p_{(X,Y)}(x,y)}{p_X(x)p_Y(y)}\right)$$

[Equation 10]

In the present disclosure, when there are two images (IMG1, IMG2), loss function is defined as below [Equation 11] by using the MI.

$$L(\alpha) = I(IMG1; IMG2 - \alpha \times IMG1)$$

[Equation 11]

Therefore, the loss function becomes a one-dimensional function having the α as an independent variable, and it may find the α value having a minimum L(α) value by using an optimizing method such as gradient descent and the like. In other words, the more IMG1 is accurately subtracted from IMG2 (the more the α is accurately inferred), information of biomolecule 1 (circular biomolecule 1 in FIG. 6b) is disappeared in IMG 2, and accordingly, MI between IMG1, which contains only the image of the biomolecule 1, and IMG2 is reduced. By using this, the α value at which the MI between IMG1 and (IMG2−α×F1) is minimized may be found.

While the existing blind unmixing techniques focused on dividing a given fluorophore, the present disclosure dramatically reduces the number of elements to be inferred for blind unmixing through a specific fluorophore selection and selection of fluorescent detection spectral range, and then, it may be accurately inferred via MI minimization.

As a result of the present disclosure, it may obtain a result of simultaneously observing 8 proteins in a tissue, which has never been achieved with the existing blind unmixing. Also, the existing blind unmixing should obtain more number of images than the number of fluorophores to be unmixed, or introduce conditions or suppositions for protein expression (e.g., one protein is expressed in one pixel), but the present disclosure works without such suggestions or conditions, and it needs only the same number of images with the number of fluorophores to be unmixed. In the present disclosure, since an image registration is not required to obtain images of 10 biomolecules, it is possible to obtain a three-dimensional multiplexed image. Therefore, it has a great effect compared to the multi-round staining which is difficult to obtain a three-dimensional image due to the difficulty of image registration.

The range of biomolecules that the present disclosure may be applied is diverse, and the present disclosure works in cultured cells, animal tissue slices, and clinical samples. The present disclosure may simultaneously image proteins labeled with several antibodies or mRNA labeled with DNA. The present disclosure is not limited to the above listed kinds of samples and kinds of biomolecules, and it may be used for imaging all biomolecules which may be labeled with fluorophores in all kinds of samples in which fluorophores may be used.

To observe biomolecules inside of a tissue with a fluorescence microscopy, labeling a specific biomolecule inside of the biological tissue with a fluorophore is required. Generally, to observe a protein, an antibody with a fluorophore is used, and in case of observing mRNA, oligonucleotide with a fluorophore may be used. In the present disclosure, an antibody is used to observe a protein, and oligonucleotide is used to observe mRNA, but the present disclosure is a technology for unmixing of spectrally overlapping fluorophores, and may be applied to all labeling method using fluorophores or all labeled molecules with fluorophores.

The apparatus of the present disclosure may be implemented with point-scanning confocal microscopy equipped with a spectral detector and filter-based spinning-disk confocal microscopy. The present disclosure may be implemented with filter-based point scanning confocal microscopy, and a filter-based widefield microscopy, and all microscopy which may selectively detect only light in a specific wavelength range.

In the present disclosure, it was succeeded to simultaneously imaging a total of 10 fluorophores by using 8 fluorophores in which emission spectra are overlapped each other and two large stoke's shift fluorophores. The present disclosure is not limited to the 10 fluorophores, and may use all fluorophores corresponding to a fluorophore selection strategy. In the present disclosure, a signal of YFP protein and a fluorophore signal of CF488A were successfully unmixed, and like this, several fluorescent proteins in which the emission spectra are overlapped or the signals of the fluorescent proteins and the fluorophores may be unmixed. In the present disclosure, when using a spectral detector, 10 fluorescence detection spectral ranges are used, and addition to the wavelength ranges, all spectral ranges corresponding to a fluorescence detection spectral range selection strategy of the present disclosure may be used. In the present disclosure, when using filter-based microscopy, 8 emission filters are used, and addition to the filters, all emission filters corresponding to a fluorescence detection spectral range selection strategy of the present disclosure may be used. The present disclosure may be implemented by using all devices capable of detecting by reflecting, transmitting, or selecting light in a specific spectral range besides the spectral detector or the emission filter. Also, the present disclosure may be implemented with various light sources, and it may be implemented by using all devices capable of emitting light in a wide spectral range, selectively selecting only light in a specific spectral range among the light and illuminating it to a sample such as a white laser, a metalhalide lamp, and a mercury lamp as well as a laser emitting light in a specific spectral range or a LED.

There are various technologies that may be combined with the present disclosure. The present disclosure shows that much more fluorophores may be used in one staining and imaging round by applying the present disclosure to t-CyCIF (Tissue-based cyclic immunofluorescence) technology which is one of the multi-round staining, and the present disclosure may be applied to all staining technologies using fluorophores. In addition, the present disclosure shows that a signal of a fluorophore may be amplified by introducing fluorescence signal amplification technology, and in the present disclosure, the existing all fluorescence amplification technology may be introduced.

Besides the method using MI minimization, in the present disclosure, various method for inferring α value may be used and combined. The first one of the examples is an α measurement method via fluorophore measurement, and the used fluorophore is made into a solution, the brightness of the fluorophore solution is measured in microscopy which is the same with the microscopy for imaging the actual sample, the α value is calculated based on the measurement value, and IMG1 and IMG2 are unmixed. The second example is an unmixing method via Gram-Schmidt Orthogonalization, and by Gram-Schmidt Orthogonalization of IMG1 and IMG2, IMG2 may be divided into a vertical component and horizontal component for IMG1(=F1).

Next, it will be described for the present disclosure, PICASSO (Process of ultra-multiplexed Imaging of biomoleCules viA the unmixing of the Signals of Spectrally Overlapping fluorophores).

Multiplexed fluorescence imaging has been extensively used in a wide range of biological and medical applications. However, the number of fluorophores that can be simultaneously used is limited to four due to spectral overlap. To overcome this limitation, various forms of spectral imaging and linear unmixing, in short spectral unmixing, have been developed. Mathematically, spectral unmixing is formulated as an inverse problem, IMG=M×F, where IMG and F are the acquired images (mixed images) and unmixed images, respectively, and M is the mixing matrix. For reliable unmixing, IMG needs to be collected over multiple spectral ranges, which requires a special instrument capable of capturing spectral profiles. For the mixing matrix M, reported emission spectra of fluorophores cannot be used; instead, this matrix must be measured for each experiment, as it depends on multiple parameters, including the optical properties of microscopy, type of specimens, buffer conditions, and microenvironment around fluorophores. In addition, the mixing matrix is also affected by imaging conditions. As a result, repeated calibrations, such as back-and-forth imaging between multiply and singly labeled specimens, are required for each experiment. Due to such calibration and instrument-related requirements, spectral unmixing has been successfully demonstrated in only a limited number of examples, such as multiplexed imaging of formalin-fixed paraffin-embedded (FFPE) thin tissue slices with specialized protocol, instrument and fluorophores or live multiplexed imaging of cultured cells. Multiple blind unmixing strategies, which attempt to directly infer both M and F from IMG through computational techniques, have been developed, but they still require calibration to separate source fluorophores with high fidelity.

Recently, various cyclic immunofluorescence imaging techniques have been developed to image more proteins from one specimen. These techniques achieve a higher level of multiplexing by repeating the staining, imaging and deactivation or removal of fluorophores. The number of cycles required to image a given number of proteins depends on the number of fluorophores that can be simultaneously used in one cycle. However, only three or four fluorophores can be used in one cycle, and one of them should be used to label the same target as a registration marker, increasing the required number of cycles. The need for more cycles increases the time and complexity of the whole imaging process. One staining cycle may take an hour to a few days, depending on the thickness of the specimens; hence, the total staining could take several days, especially for thick specimens. In addition, depending on the protocol, distortion of tissues or loss of cells increases with the increased number of fluorophore bleaching or removal cycles. Due to these problems, a technique that enables the use of more than four fluorophores in one cycle is highly demanding.

The present disclosure, PICASSO, is a simple but highly reliable technique that enables 10-color multiplexed imaging of biomolecules in one staining and imaging step via blind unmixing of the signals of spectrally overlapping fluorophores. The present disclosure does not rely on special chemicals or instruments; instead, it jointly optimizes the selection of fluorophores, detection spectral ranges and unmixing algorithms and achieves a high level of multiplexing with conventional instruments and without any calibration. The present disclosure can be combined with the antibody complex formation technique and visualize 10 proteins using only rabbit antibodies. In addition, the present disclosure can be used for multiplexed RNA imaging, multiplexed protein imaging over a large area and multiplexed 3-D imaging of proteins. Also, the present disclosure can be applied to expansion microscopy, tissue clearing and imaging of clinical specimens to improve their multiplexing capabilities. Last, the present disclosure can improve the multiplexing capability of cyclic immunofluorescence imaging techniques by allowing them to use more fluorophores in one round.

Figure 7:
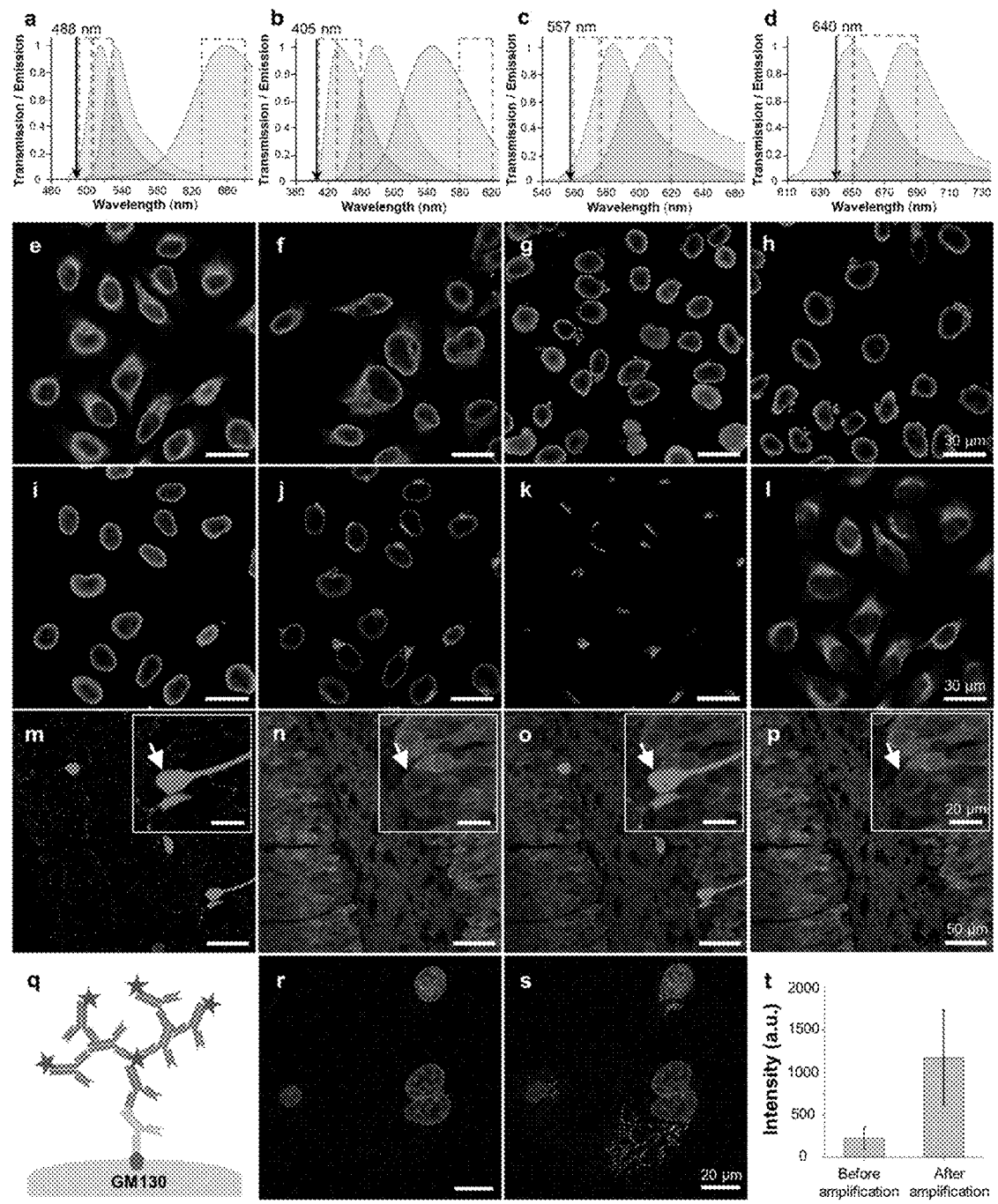
FIG. 7 is an example of multiplexed imaging by each laser, validation thereof, and a result of combining with a signal amplification technology according to an example of embodiments.

FIG. 7 is an example of multiplexed imaging by each laser, validation thereof, and a result of combining with a signal amplification technology according to an example of embodiments.

Referring to FIG. 7, (a-d) Normalized emission spectra of fluorophores (solid curves) and detection spectral ranges (dotted rectangles) used in the present disclosure for each excitation laser (black arrow). (a) CF488A (the leftmost curve), ATTO 514 (the middle curve) and ATTO 490LS (the rightmost curve) excited by a 488-nm laser. Detection spectral ranges: 489-505 nm (the leftmost rectangle), 506-530 nm (the middle rectangle), and 630-680 nm (the rightmost rectangle). (b) CF405S (the leftmost curve), ATTO 390 (the middle curve) and CF405L (the rightmost curve), excited by a 405-nm laser. Detection spectral ranges: 406-430 nm (the leftmost rectangle), 431-460 nm (the middle rectangle) and 580-620 nm (the rightmost rectangle). (c) CF568 (left curve) and ATTO Rho101 (right curve), excited by a 557-nm laser. Detection spectral ranges: 558-575 nm (left rectangle) and 576-620 nm (right rectangle). (d) CF633 (left curve) and CF660R (right curve), excited by a 640-nm laser. Detection spectral ranges: 641-650 nm (left rectangle) and 651-690 nm (right rectangle).

(e-h) Two- or three-color multiplexed immunofluorescence images of HeLa cells after unmixing via MI minimization. Nuclear envelope marker (lamin A/C), golgi apparatus marker (GM130) and intermediate filament marker (vimentin) were used. The fluorophores and detection spectral ranges shown in a-d were used.

(i-l) Three channels of the image shown in e before and after unmixing. (i) Image acquired in the first detection spectral range of a (the leftmost rectangle). (j) Image acquired in the second detection spectral range of a (the middle rectangle). (k) Unmixed image. α was estimated from the two images shown in i and j via MI minimization and then used for unmixing. (l) Image acquired in the third detection spectral range (the rightmost rectangle) of a.

(m-p) Validation of α estimation via MI minimization. (m,n) Immunofluorescence image of parvalbumin (m) and calbindin (n). (o) Synthetic mixed image (SynIMG) of m (F1) and n (F2) with an α value of 2 (SynIMG=2×F1+F2). (p) Calbindin channel after unmixing via MI minimization.

(q-t) Signal amplification by using an anti-fluorophore antibody. (q) Schematic showing the mechanism of signal amplification. (r,s) Fluorescence image acquired in the first detection spectral range before r and after s signal amplification. In r, GM130 was almost invisible, as the same imaging and visualization conditions, which did not saturate GM130 signals in s, were used for both r and s. DAPI was used as a fiducial marker. (t) Signal intensity change of GM130 (Alexa 488) before and after signal amplification (n=12, error bar: standard deviation).

First the unmixing via MI minimization with four standard excitation lasers (405, 488, 557, and 640 nm) was validated. The emission spectra and detection spectral ranges of each excitation laser are shown in FIG. 7a-d. For each laser, two spectrally overlapping fluorophores were used. For 405- and 488-nm lasers, the signals of the large stoke's shift fluorophores were detected by using the third detection spectral ranges, as shown in FIG. 7a,b. Using these fluorophores and standard indirect immunostaining, two- or three-color multiplexed imaging was performed by using only one laser shown in FIG. 7e-h. For each laser, mixed images were acquired in the first and second detection spectral ranges and then unmixed via MI minimization, as shown in FIG. 7i-1. The unmixing of the same images were successful via Gram-Schmidt orthogonalization (referring to FIG. 20). In addition, the unmixing of two images acquired by direct immunostaining was demonstrated. To validate whether the MI minimization precisely estimates α, synthetic mixed image (FIG. 7m-o) was generated and unmixed via MI minimization. The unmixed image (FIG. 7p) was visually identical to the input image (FIG. 7n). The estimated α value was 2.01, which is 0.5% larger than the ground-truth value. Further, the α estimation accuracy by generating synthetic images with α values varying from 0.5 to 2 with a 0.05 increment was tested. The average error of α estimation was less than 1%. Also, the unmixing via MI minimization can unmix two input images with high MI was validated.

Next, the underlying assumption of the present disclosure that the signal intensity of the second fluorophore in the first detection spectral range is negligible was validated. First, from the emission spectra of FIG. 7a-d, the fluorescence intensity ratio between the two fluorophores in the first detection spectral range was calculated. The ratio was 178.7 in the 405-nm laser, 26.4 in the 488-nm laser, 8.5 in the 557-nm laser, and 17.7 in the 640-nm laser. The ratio of the fluorophore was the lowest in the 557-nm laser, but when the image was obtained from the first detection spectral range by actually immuostaining the two fluorophores, there was no signal of the second fluorophore. It is considered that the reason is that among the two fluorophores, CF568 and ATTO Rho 101, used in the 557-nm laser, the absorption coefficient of the second fluorophore ATTO Rho 101 in the 557-nm laser is lower than that of CF568. The fluorescent intensity of the above two fluorophores was measured in another microscopy system in order to confirm whether this supposition is valid in another microscopy system. As a result, the fluorescent intensity ratio of the two fluorophores in the first detection spectral range was 28.4. Such signal intensity ratio may be much higher through signal amplification. The present disclosure showed that the signal intensity ratio in the first detection spectral range may be improved to more than 100:1 by amplifying only the signal of the first fluorophore among the two fluorophores, in which the emission spectra are overlapped, by more than 5 times (FIG. 7q-t).

Figure 8:
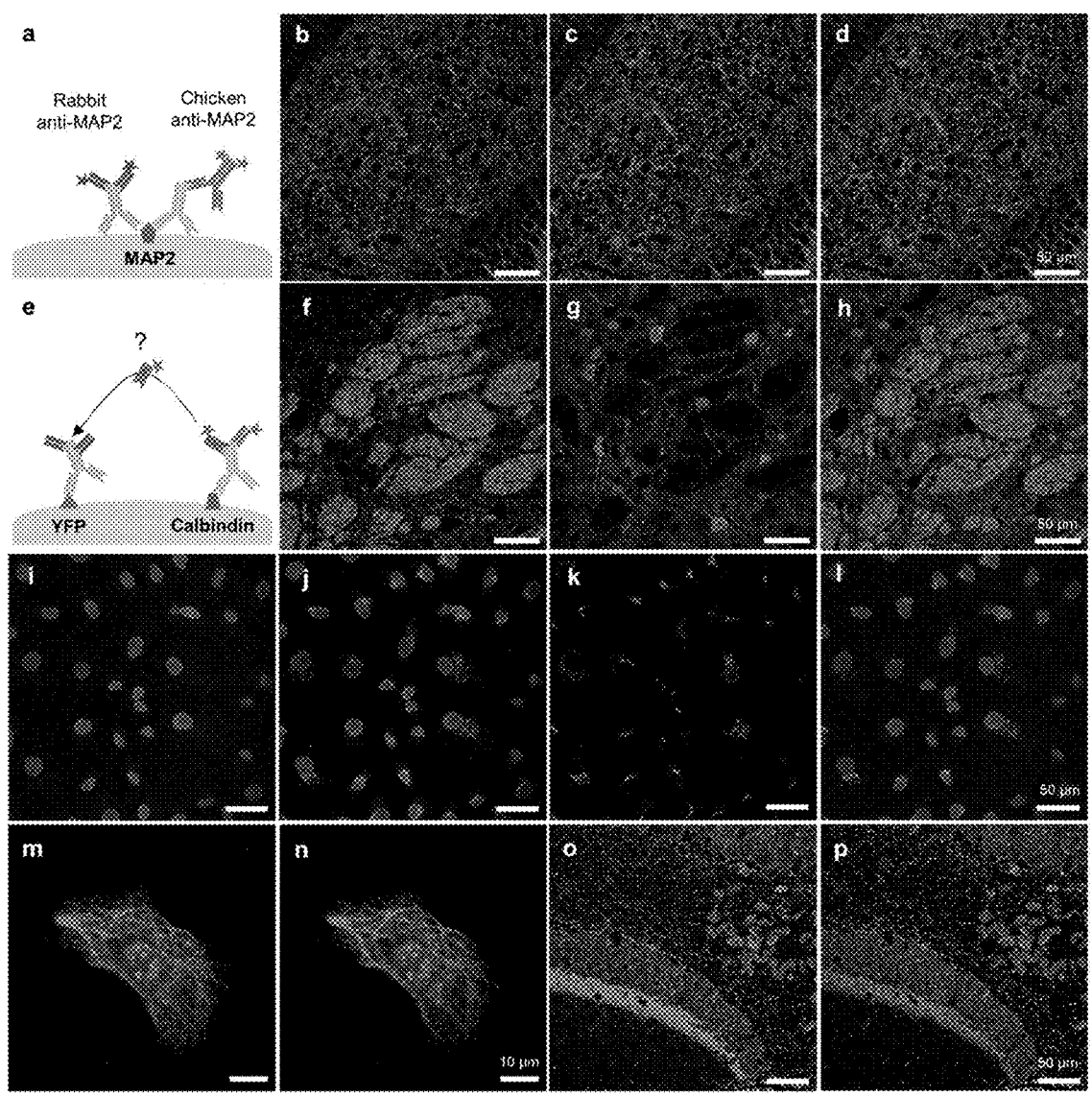
FIG. 8 is a result of using an antibody generated in the same host, a result of applying it to cleared tissue, and a result of simultaneously imaging mRNA and protein according to an example of embodiments.

FIG. 8 is a result of using an antibody generated in the same host according to an example of embodiments.

Referring to FIG. 8, it is a result of unmixing signals by multiplexed fluorescence imaging with primary antibodies generated from the same host via MI minimization.

(a-d) Validation of the staining by using a preformed antibody complex. (a) Schematic of the validation. (b) Image of MAP2 labeled with a preformed antibody complex against MAP2. (c) Image of MAP2 labeled with a regular primary and secondary antibody. (d) Overlay of the images shown in b and c.

(e-h) Study on the crosstalk between two preformed antibody complexes by using a Thy1-YFP mouse brain slice. (e) Schematic of the study. (f) YFP signal of the specimen. (g) Signal of the preformed antibody complex against calbindin. (h) Overlay of the two images shown in f and g.

(i-l) Validation of the unmixing via MI minimization. (i-l) Result of unmixing signals for multiplexed immunostaining by preformed antibody complexes having fluorophores in which emission spectra are overlapped. BS-C-1 cell was stained with two preformed rabbit antibody complexes against lamin B1 and GM130. The two antibody complexes have only one fluorophore among CF633 or Alexa 680. Two images were obtained from two detection spectral ranges at a 640-nm laser excitation, and these were unmixed via MI minimization. (i) Image obtained from the first detection spectral range, and only lamin B1 was observed. (j) Image obtained from the second detection spectral range, and both of lamin B1 and GM130 were observed. (k) After unmixing via MI minimization. (l) Overlay of the images shown in i and k.

(m-n) Result of simultaneous imaging of mRNA and protein with one excitation laser by using the present disclosure. GAPDH mRNA was labeled with Alexa 488, and vimentin protein was labeled with ATTO 514. (m) Before unmixing. (n) After unmixing.

(o-p) Result of four-color multiplexed fluorescence imaging of the mouse brain slice processed with SHIELD which is a brain clearing technology with two excitation lasers. (o) Before unmixing. (p) After unmixing.

The present disclosure can be combined with the primary antibody-Fab complex preformation technique, which enables the use of multiple primary antibodies from the same host species. In this technique, primary antibodies are incubated with fluorophore-conjugated Fab fragments of secondary antibodies in a tube separately and then used together to stain multiple target proteins simultaneously. Rabbit was chosen as the host species of primary antibodies, as 70% of commercially available primary antibodies are produced from rabbits. First, the staining of the preformed antibody complex was validated. As shown in FIG. 8a-d, a preformed antibody complex and regular antibody showed the same staining pattern, without any noticeable difference (referring to FIG. 12 for more examples). And then, the crosstalk between two preformed antibody complexes was tested when they were applied to a specimen at the same time. As shown in FIG. 8e-h, two preformed antibody complexes did not show any crosstalk between them (see FIG. 13 for another example). We also confirmed that the antibody-Fab complex preformation technique works with a primary antibody from chicken. We tested the staining of a total of 62 primary antibodies and 26 fluorophores after forming preformed antibody complexes, and no detectable artifacts were observed (see Table 2 for the list of antibodies, and Table 3 for the list of fluorophores). Even though a preformed antibody complex is larger than a primary antibody alone, the complex showed similar staining depth with a primary antibody, indicating that this approach can be used for the staining of thick tissue slices.

Figure 14:
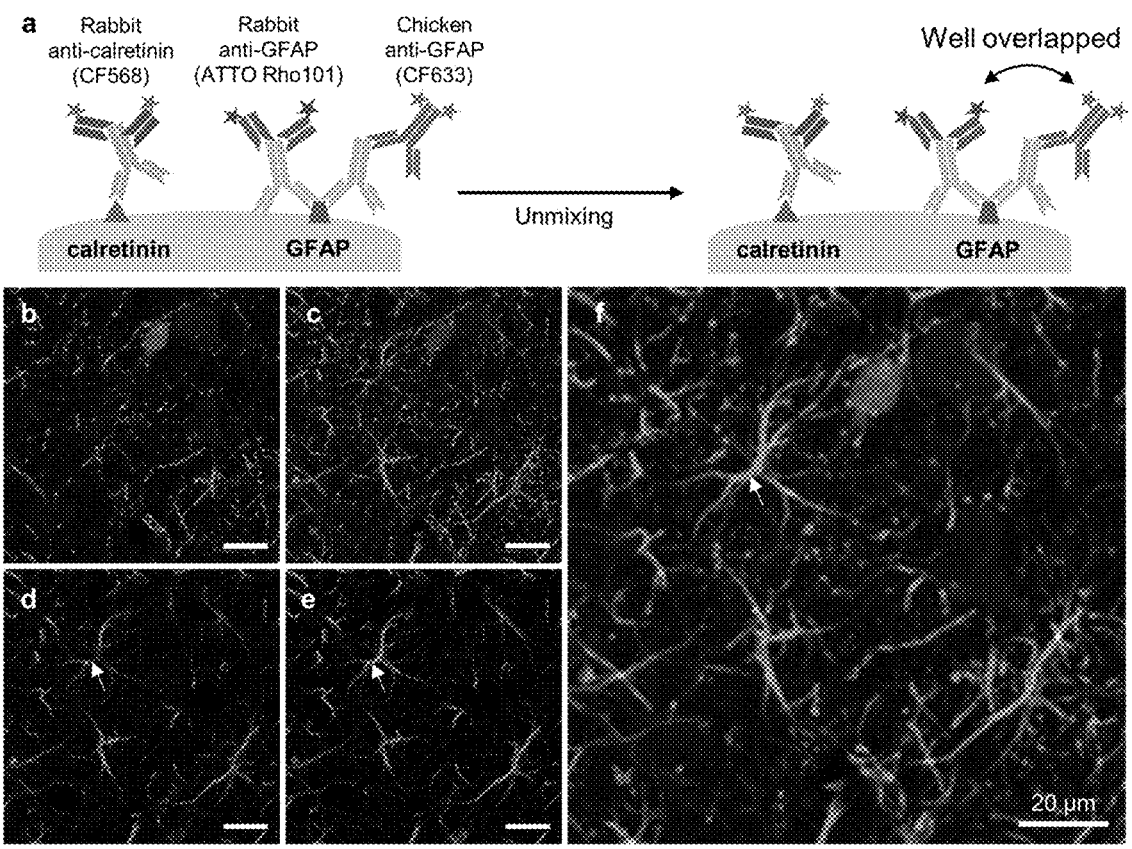
FIG. 14 is a result of validation of signal unmixing via mutual information minimization in a sample stained using an antibody complex.
Figure 15:
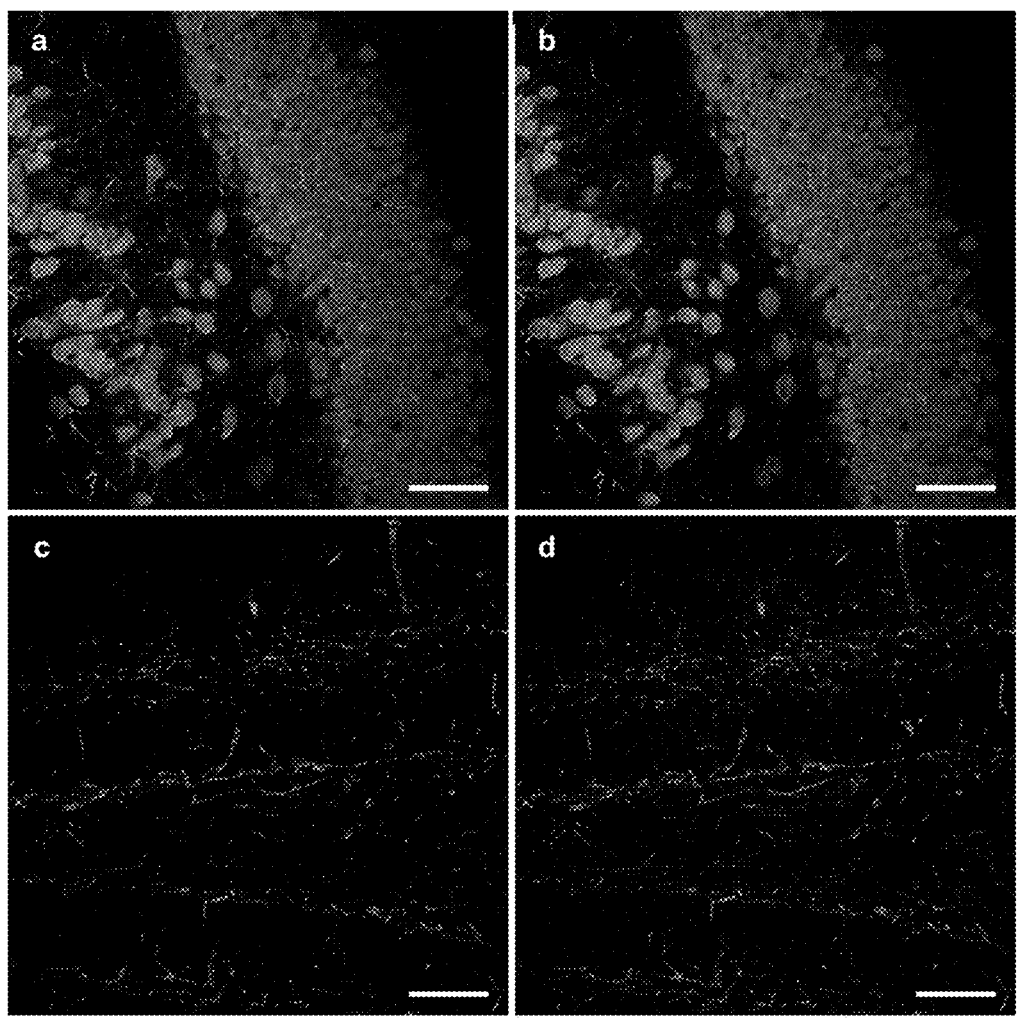
FIG. 15 is a result of validation of compatibility of the present disclosure and an ExM (expansion microscopy)

Next, the unmixing of fluorescent signals of specimens stained with preformed antibody complexes was validated. To validate the accuracy of the unmixing, a mouse brain slice was stained with two preformed antibody complexes against glial fibrillary acidic protein (GFAP) and calretinin. At the same time, the slice was stained with a chicken antibody against GFAP. The GFAP signal generated by the unmixing was identical to the signal of regular staining, as shown in FIG. 14. Further, as shown in FIG. 8i-1, unmixing via MI minimization successfully separated two proteins, which are located in different cellular compartments. The present disclosure can be applied to image more diverse molecular species. First, two mRNA molecules labeled with two spectrally overlapping fluorophores can be separated. In addition, mRNA and protein, labeled with two spectrally overlapping fluorophores, can be imaged and unmixed by using the same approach (FIG. 8m,n). Last, the present disclosure can be applied to more diverse applications. The present disclosure may be combined with expansion microscopy (ExM), which achieves a 60-nm resolution with conventional microscopy via physical expansion of specimens. The present disclosure successfully enabled two-color multiplexed imaging of expanded specimens using one excitation laser and two spectrally overlapping fluorophores (FIG. 15). Also, the present disclosure enables four-color multiplexed imaging of cleared specimens (stabilization to harsh conditions via intramolecular epoxide linkages to prevent degradation (SHIELD)) with two excitation lasers and two pairs of spectrally overlapping fluorophores (FIG. 8o,p). For the ExM-processed and cleared tissue, images were acquired either in 1× phosphate-buffered saline (PBS) or deionized water. Even in such different buffer conditions, MI minimization successfully unmixed images and improved the multiplexing capabilities of ExM and SHIELD by allowing them to use more fluorophores simultaneously.

Figure 9:
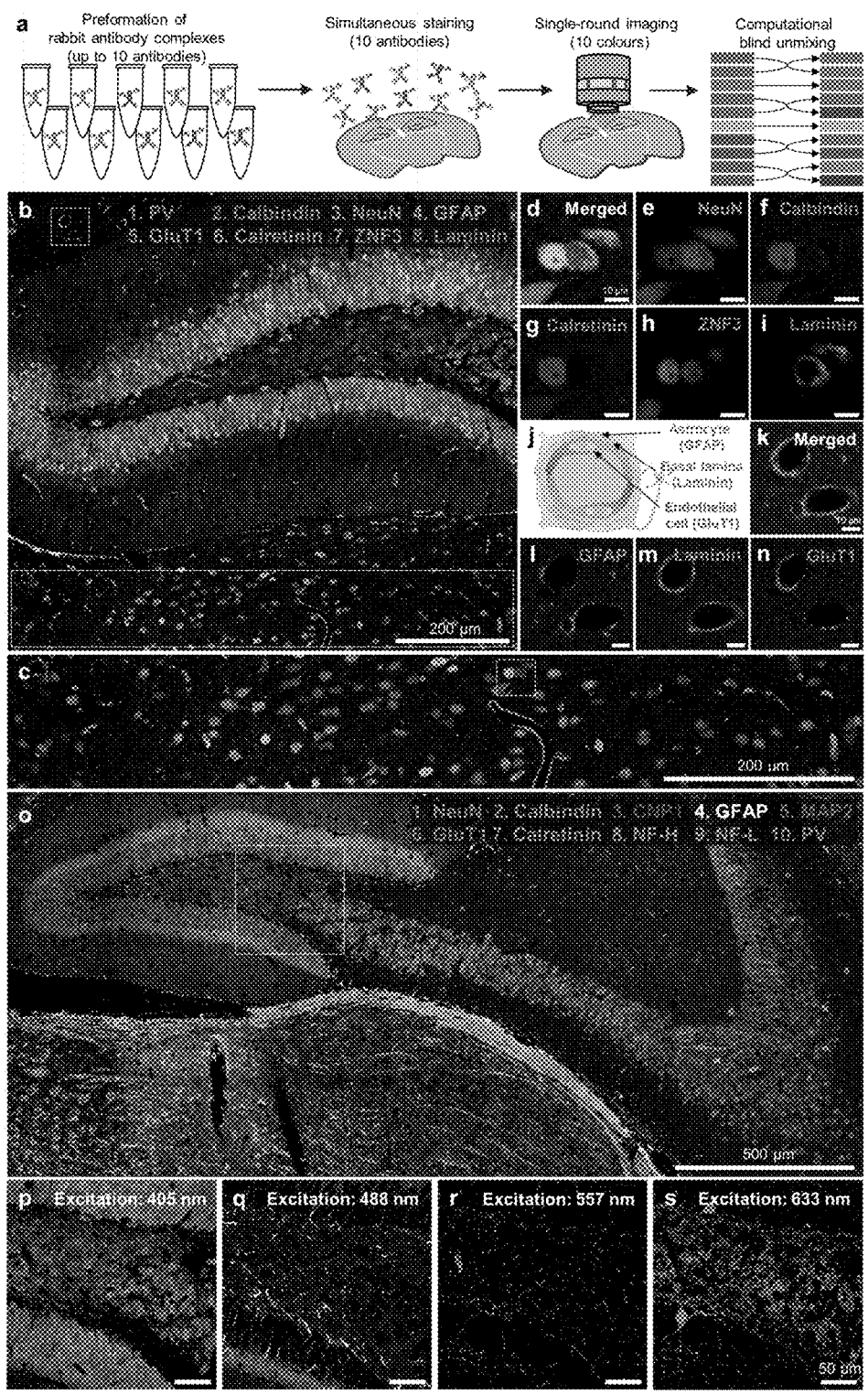
FIG. 9 is a result of simultaneous imaging of 8 to 10 proteins according to an example of embodiments.

FIG. 9 is a result of simultaneous imaging of 10 proteins according to an example of embodiments.

Referring to FIG. 9, it is a result of ultra-multiplexed fluorescence imaging of a mouse brain through the present disclosure.

(a) Experimental process of 10-color multiplexed imaging via PICASSO.

(b) Eight-color multiplexed imaging of the dentate gyrus of the mouse hippocampus (corresponding to slide 73 of the Allen Brain Reference Atlas, P56 mouse, coronal sections). (c) Magnified view of the dotted boxed region at the bottom of b.

(d-i) Magnified view of the dotted boxed region in c for individual labeled proteins. (j) Structure of the BBB. (k-n) Magnified view of the dotted boxed region at the left top of b, clearly showing the cellular structures of the BBB.

(o) Ten-color multiplexed imaging of the mouse hippocampus (corresponding to slide 77 of the same brain reference atlas). (p-s) Magnified view of the dotted boxed region of o. Two- or three-color multiplexed images after unmixing as acquired with a single excitation laser.

The present disclosure can be used ultra-multiplexed imaging of the mouse brain (FIG. 9a). Eight preformed rabbit antibody complexes against parvalbumin (PV), calbindin, neuronal nuclei (NeuN), GFAP, glucose transporter 1 (GluT1), zinc finger protein 3 (ZNF3), laminin and calretinin were simultaneously applied to a mouse brain slice. An eight-color mosaic image was acquired over a millimeter with a lateral resolution of 250 nm and then unmixed after estimating α over the whole image (FIG. 9b). The resulting image showed heterogeneous protein expression in the thalamus, as shown in FIG. 9c. For example, when the protein expression levels of the two cells in the dotted box in FIG. 9c were compared, the left cell highly expressed NeuN, calbindin, calretinin and ZNF3; by contrast, the right cell highly expressed NeuN and laminin (FIG. 9d-i). Eight-color imaging also showed the cellular organization of the blood-brain barrier (BBB) from the same specimen (FIG. 9j-n). As previously reported, endothelial cells were surrounded by a basal lamina and then wrapped by the end-feet of astrocytes in the BBB (FIG. 9j). We compared the spatial expression patterns of five proteins (calbindin, calretinin, ZNF3, NeuN, and PV) with literature reports and databases, and the protein expression patterns we observed matched with these reports.

Next, by using the present disclosure, 10-color multiplexed imaging was successfully performed. A mouse brain slice was stained with 10 preformed antibody complexes against NeuN, CNP1, calbindin, calretinin, GFAP, microtubule-associated protein 2 (MAP2), neurofilament-H (NF-H), GluT1, neurofilament-L (NF-L) and PV. Then, 10 images were acquired in 10 detection spectral ranges and unmixed via MI minimization. As a result, the 10 proteins were successfully visualized over a few millimeters (FIG. 9o). The lateral posterior nucleus of the thalamus (the region in the right half of the dotted circle in FIG. 9o) showed high calbindin and calretinin expression, matching the results reported in various database and the literature.

Figure 10:
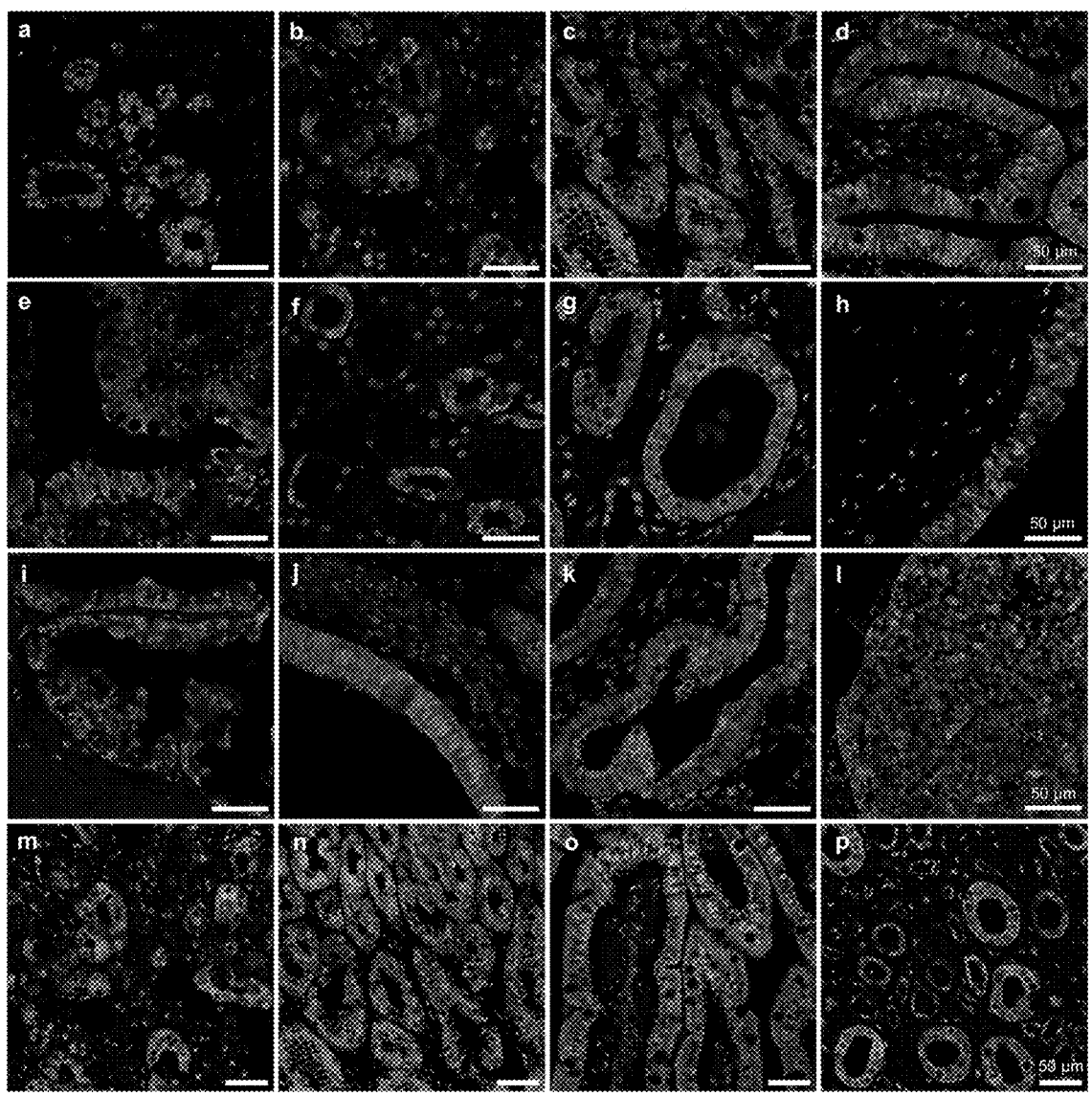
FIG. 10 is a result of multiplexed imaging of clinical specimens according to an example of embodiments.

FIG. 10 is a result of multiplexed imaging of clinical specimens according to an example of embodiments.

Referring to FIG. 10, it is multiplexed imaging in FFPE clinical samples through the present disclosure.

(a-l) Two-color multiplexed imaging of twelve different human tissue types using one excitation laser (KRT 19 (CF488A) and histone H3 (ATTO 514) were visualized). (a) Breast. (b) Salivary gland. (c) Stomach; body. (d) Small intestine; jejunum. (e) Colon. (f) Kidney; cortex. (g) Kidney; medulla. (h) Bladder. (i) Prostate. (j) Endometrium; proliferative. (k) Endometrium; secretory. (l) Thymus.

(m-p) Four-color multiplexed imaging of the same human tissue types using two excitation lasers (KRT 19 (CF488A), histone H3 (ATTO 514), COX IV (CF568) and vimentin (ATTO Rho101) were visualized). (m) Salivary gland. (n) Stomach; body. (o) Small intestine; jejunum. (p) Kidney; medulla.

It was shown that the present disclosure may be also applied to the clinical specimen. The present disclosure was tested whether it works with clinical samples using a TMA (tissue microarray) containing FFPE (Formalin-fixed paraffin-embedded) specimens from 12 human organs. First, Keratin 19 and histone H3 were used as target proteins. Both proteins are highly expressed in almost all human organs, and their expression change or modification is used as a cancer marker. As keratin 19 and histone H3 are expressed in different locations in the cell (in the cytoplasm and nucleoplasm), their expression patterns should be spatially separated if their signals are successfully unmixed. As shown in FIG. 10a-l, it may be seen that keratin 19 and histone H3 are clearly spatially separated in all 12 organs. This result shows that two proteins may be simultaneously imaged with one excitation laser in the clinical samples by using the present disclosure.

Furthermore, expressions of four proteins (keratin 19, histone H3, vimentin, cytochrome c oxidase subunit 4; COX IV) were imaged in the FFPE specimens from 4 human organs. Like keratin 19 and histone H3, vimentin and COX IV are closely related to caner and are used as cancer markers. Also, as the vimentin: keratin ratio is related to the EMT (epithelial-mesenchymal transition) status, simultaneous imaging of vimentin and keratin in a single specimen is clinically important. As shown in FIG. 10m-p, it was possible to simultaneously observe four proteins by using two pairs of fluorophores in which emission spectra are overlapped and two excitation lasers in the clinical specimen. The above experimental result shows that the present disclosure successfully works in the clinical specimens.

Figure 11:
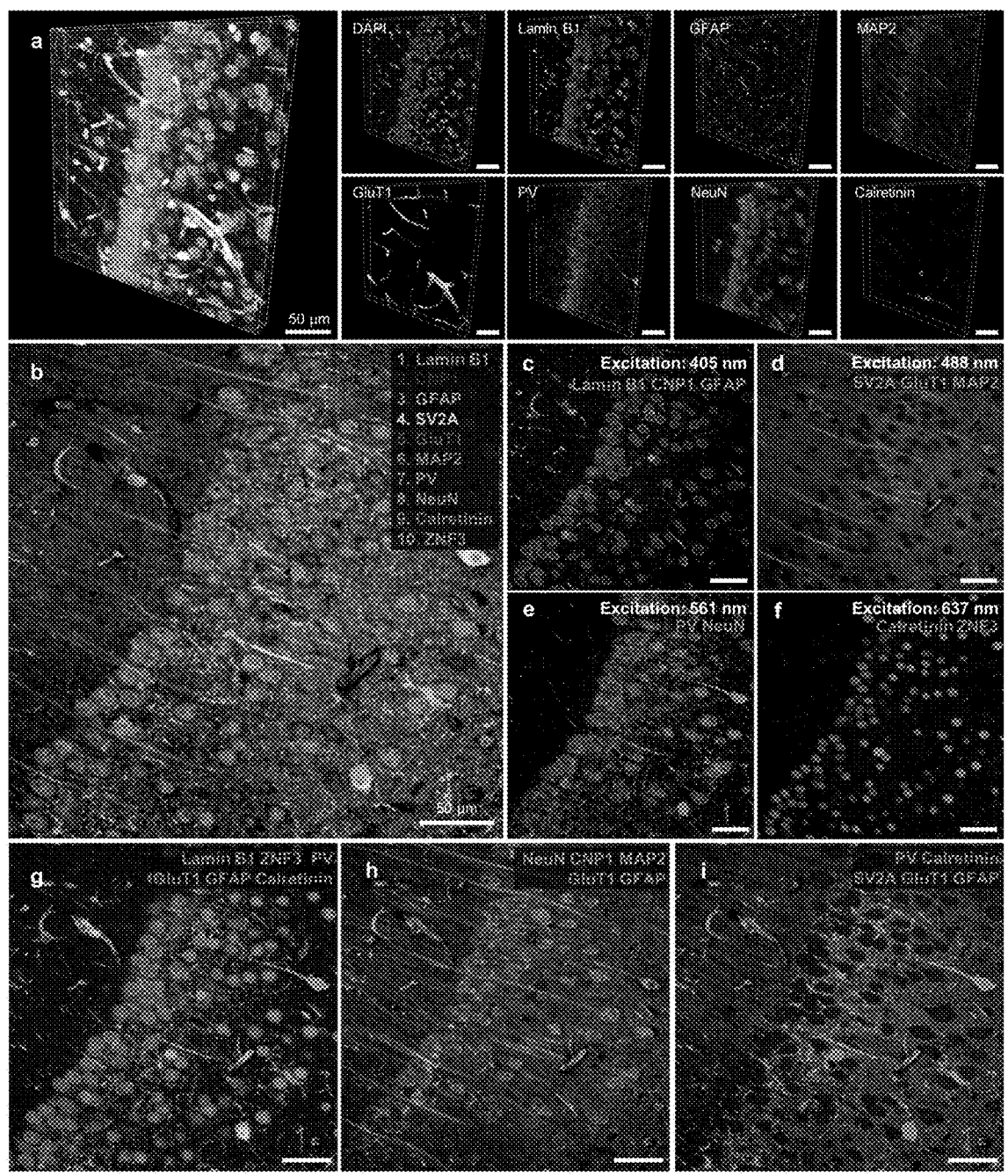
FIG. 11 is a result of three dimension multiplexed imaging and multiplexed imaging by using a band-pass filter based microscopy without a spectral detector according to an example of embodiments.

FIG. 11 is a result of three dimension multiplexed imaging and multiplexed imaging by using a band-pass filter without a spectral detector according to an example of embodiments.

Referring to FIG. 11, it is a result of three dimension multiplexed imaging and ten color multiplexed imaging of the mouse brain by using band-pass filter based microscopy without a spectral detector.

(a) Three-dimensional view of a z-stack image acquired from a mouse brain slice stained with eight fluorophores and preformed antibody complexes.

(b) Ten-color multiplexed imaging of the mouse hippocampus CA1 via the present disclosure. The images were acquired using a confocal microscope equipped with eight band-pass filters and four excitation lasers. (c-f) Two or three channels of the image shown in b, acquired by one of the four excitation lasers. The wavelengths of the excitation lasers are (c) 405 nm, (d) 488 nm, (e) 561 nm, and (f) 637 nm.

(g-i) Overlay image of five or six channels chosen from the image shown in b to clearly visualize different sets of biologically relevant channels together. Different display colors were used for proteins in each image to maximize the visibility. (a-i) All antibodies were rabbit primary antibodies. All scale bars: 50 μm.

Three demonstrations of the present disclosure, which possibly maximize the potential of PICASSO, were attempted. First, 3-D eight-color multiplexed imaging of a thick mouse brain slice via the present disclosure was demonstrated (FIG. 11a). Eight fluorophores, including three pairs of spectrally overlapping fluorophores, were used along with eight rabbit primary antibodies. After the z-stack imaging, a was estimated from the whole z-stack and used for unmixing. Also, the signal of yellow fluorescent protein (YFP) and a fluorophore, whose emission spectrum overlaps with that of YFP, can be unmixed by using MI minimization and 3-D seven-color multiplexed imaging of a transgenic mouse can be achieved.

It showed that it is possible to simultaneously observe ten proteins with only band-pass filter without the spectral detector. Among a variety of commercially available band-pass filters, an optimal band-pass filter matched well with the used detection spectral range was selected. It appeared that the brightness ratio between two fluorophores in first band-pass filter in 561-nm laser and 637-nm laser was not high enough on spectrum. However, when actually measuring the ratio by using fluorophore solution, the brightness ratio of the two fluorophores is 32.8 in the 561-nm laser and 20.3 in the 640-nm laser. It seems that this ratio may be improved by using a custom band-pass filter. Also, it may be more improved by using the signal amplification process shown in FIG. 7q-t. To simultaneously use ten fluorophores, images were obtained from ten detection spectral ranges, but in a general microscopy, up to eight band-pass filters may be installed. Therefore, with a method using one filter repeatedly in two excitation lasers, 10 proteins may be imaged with 8 band-pass filters.

Next, 10-color multiplexed imaging with band-pass filters without a spectral detector was attempted (FIG. 11b). Microscopy systems equipped with a spectral detector are still not commonly available in most research laboratories and hospitals; instead, most microscopy systems use band-pass filters to detect fluorescence signals in a specific range of wavelengths. Multiple commercially available band-pass filters were tested and chosen the ones that best matched the detection spectral ranges the present disclosure proposed with a spectral detector. Most band-pass filter-based microscopes were able to accommodate up to eight filters, so two filters were used twice for ten-color imaging (with different excitation lasers each time). A mouse brain slice was stained with 10 preformed rabbit antibody complexes against lamin B1, CNP1, GFAP, synaptic vesicle protein 2A (SV2A), GluT1, MAP2, PV, NeuN, calretinin and ZNF3. The stained brain slice was then imaged with a confocal microscope equipped with eight band-pass filters, and the signals were unmixed via MI minimization (FIG. 11b-f). By using this instrumental setting, a 10-color multiplexed image with a lateral resolution of 300 nm over a field of view of 320×320 µm was acquired in less than 6 seconds (with a 40×NA1.15 objective). At this speed, imaging of a 1 mm$^2$ field of view would take approximately 1 min. Among the ten channels, five or six channels were selected and overlaid to better visualize the biological contexts (FIG. 11g-i). As shown above, 10-color multiplexed imaging was successfully demonstrated with commercial band-pass filters, even though the detection spectral ranges of the filters did not perfectly match the detection spectral ranges we used with a spectral detector. Images with a higher SNR could be obtained if custom band-pass filters optimized for each microscopy system were designed and used.

Figure 19:
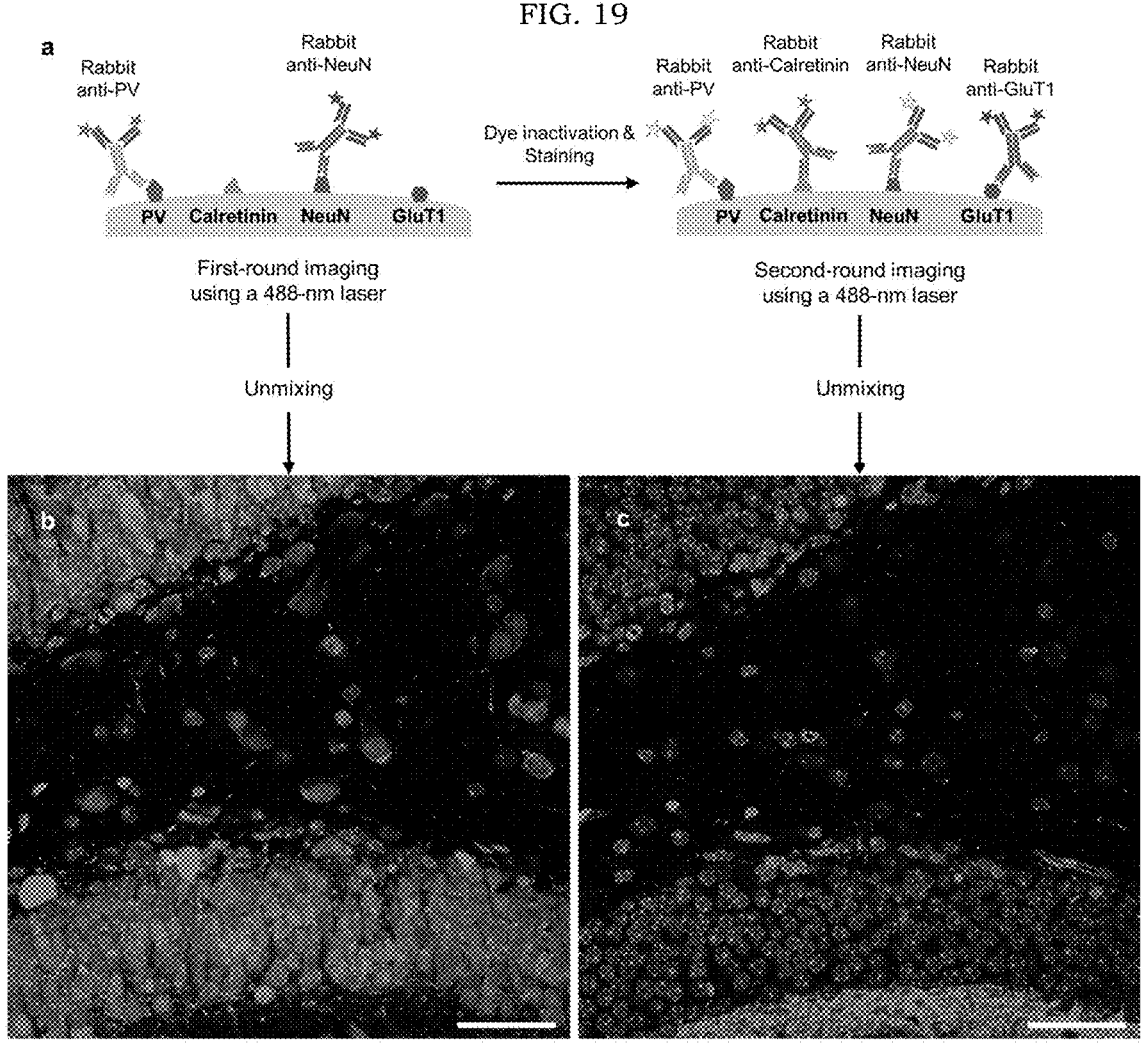
FIG. 19 is a drawing for describing application of the present disclosure to another multiplexed imaging technology (t-CyCIF)

Last, the present disclosure can be used with cyclic immunofluorescence imaging techniques. A brain slice was stained with two preformed rabbit antibody complexes labeled with spectrally overlapping fluorophores, imaged, chemically bleached via tissue-based cyclic immunofluorescence (t-CyCIF) protocol, re-stained with another two preformed rabbit antibody complexes labeled with spectrally overlapping fluorophores, and then imaged again (FIG. 19). MI minimization unmixed signals of two spectrally overlapping fluorophores in both cycles, indicating that the present disclosure can be combined with t-CyCIF to increase the number of fluorophores that can be used simultaneously in one cycle.

Likewise, since 10 fluorophores are applied to the sample at once, the complexity of experimental process and the required time are greatly reduced compared to other multiplexed imaging technologies. Also, since images of 10 biomolecules may be obtained by one imaging without solution exchange or chemical treatment, image registration process is not required, and it is possible to obtain a three dimensional image. In addition, since it may be implemented with only the band-pass filter without the spectral detector, equipment requirements are greatly reduced. Therefore, the present disclosure may be very useful in biological research and diagnosis.

The present disclosure may image 12 biomolecules with only one round imaging by using a NIR (near-infrared) laser and two NIR fluorescent molecules (e.g.: ATTO740 and Cy7.5) in which emission spectra are overlapped in addition to the above used four lasers in the visible band (400-650 nm). Also, when additionally using 560 nm 640 nm, and large stoke's shift fluorophores excited in NIR, 15 biomolecules may be simultaneously imaged. When using a custom multi-band-pass filter, 15 biomolecules may be simultaneously imaged with only 8 band-pass filters. Signal intensity and SNR (signal to noise ratio) may be improved. Also, the present disclosure may be implemented by using simple optical microscopy equipped with low price light source (LED or lamp) and the band-pass filter. High signal intensity and unmixing may be obtained with simple equipment by using the custom band-pass filter. Imaging ability of corresponding technology may be improved by combining with diverse imaging technologies such as tissue clearing, expansion microscopy, mRNA or protein multiplexed fluorescent imaging, bioassay, cell tracking, and the like. In addition, the amount of information that a single barcode may encode may be increased by combining with fluorescent barcode technology. The present disclosure is expected to be used in various fields requiring biomolecule spatial information. Recently, as multi-scale 3-D atlases of biomolecules have been constructed, the method for understanding biology has been changed. In constructing these atlases, fluoresce imaging is one of the major tools to map the biomolecules. The present disclosure may simultaneously visualize more biomolecules, and may provide information about the colocalization of proteins or mRNA molecules or about how their expressions are correlated. Also, it will be helpful in diagnosis and prognosis of cancer by visualizing the molecular structure of the clinical specimen.

Cell culture and fixation are as follows.

BS-C-1, HeLa, NIH-3T3 cells were purchased from the Korean Cell Line Bank. The cells were cultured in a Nunc Lab-Tek II chambered #1.5 coverglass. The BS-C-1 cells were cultured in MEM (Minimum Essential Medium) supplemented with 10% FBS (fetal bovine serum), 1% penicillin-streptomycin and 1% sodium pyruvate. The HeLa cells were cultured in DMEM (Dulbecco's modified Eagles' medium) supplemented with 10% FBS and 1% penicillin-streptomycin. The NIH-3T3 cells were cultured in DMEM supplemented with 10% BCS (bovine calf serum) and 1% penicillin-streptomycin. All cells were incubated at 37° C. in 5% $CO_2$. For the fixation, the cells were washed with 1×PBS (phosphate-buffered saline) three times and fixed with 4% PFA (paraformaldehyde) in 1×PBS for 10 min, then washed with 1×PBS three times. The cells were then incubated with 0.1 M glycine in 1×PBS for 10 min and washed with 1×PBS three times.

Mouse brain perfusion and slicing are as follows.

All of the following procedures involving animals were approved by the KAIST-IACUC (Korea Advanced Institute of Science and Technology Institutional Animal Care and Use Committee). C57BL/6J mice aged 8-14 weeks were used. The mice were anesthetized with isoflurane and transcardially perfused with 4% PFA in 1×PBS. Brains were harvested from the mice fixed through the perfusion and stored for 2 h in 4% PFA in 1×PBS in an environment maintained at 4° C. Then, the brains were sliced into 150 µm-thick slices on a vibratome (Leica VT1000S). The slices were stored in 1×PBS supplemented with 0.1 M glycine at 4° C. until use.

Conjugation of antibodies with fluorophores is as follow.

For conjugation of the Alexa and CF fluorophores, 10 µL of 1 M sodium bicarbonate (pH 8.3) and a 9-fold molar excess of succinimidyl ester-fluorophore stock in DMSO were added to the antibody solutions. The solutions were incubated at RT (room temperature) for 1 h in darkness. For the ATTO fluorophores conjugation, a buffer of antibody solutions was exchanged to a conjugation buffer (0.01 M sodium bicarbonate in 1×PBS, pH 8.3) using Zeba Spin Desalting Columns. A 3-fold molar excess of the succinimidyl ester-fluorophore stock (10 mg/mL) in DMSO was then added to the buffer-exchanged antibody solutions. These solutions were incubated at RT for 1 h in darkness. To purify the conjugated antibodies, NAP-5 gel filtration columns were used. The columns were equilibrated with 10 mL of 1×PBS. 100 µL of the reacted solutions were loaded into the columns. When 400 µL of 1×PBS were added to the columns, separation layers of the antibodies conjugated with the unconjugated fluorophore were observed. The eluates were collected after locating collecting tubes under the columns and loading 500 µL of 1×PBS into the columns. Then, the eluates were concentrated using Vivaspin columns (MWCO: 5,000).

Preparation of antibody complexes is as follows.

1×PBS, a solution containing a fluorophore-conjugated Fab fragment, and a solution containing a primary antibody were mixed at a volume ratio of 10:2:1 and then incubated for 10 min at RT in darkness. Then, a 5-fold excess volume of a blocking buffer (10% normal rabbit serum, 0.2% Triton X-100, 1×PBS) was then added to the solution and incubated for 10 min at RT in darkness with gentle shaking. The 26 fluorophores tested with the preformed antibody complex.

Staining of cells and mouse brain slice with preformed antibody complexes is as follows.

All of the following steps were performed at RT. For permeabilization and blocking, cells were incubated in a blocking buffer (10% normal rabbit serum, 0.2% Triton X-100, 1×PBS) for 30 min. The cells were then stained with a preformed antibody complex mixture for 30 min and then washed three times with the blocking buffer. For the staining of mouse brain slices, blocking, staining and washing steps were identical to the cultured cell protocol except for the incubation time (blocking: 3 h, washing: 30 min, staining: overnight).

Preparation of samples and staining of clinical samples are as follows.

The following experiments using human samples were all approved by the KAIST IRB (Korea Advanced Institute of Science and Technology Institutional Review Board). The human normal multi-organ tissue microarray (TMA) used in FIG. 10 was purchased from Novus Biologicals (NBP2-30189). For the FFPE clinical samples, the sample slides were dried for 1 h in an oven at 60° C. The slides were then deparaffinized in xylene twice for 5 min each time. For hydration, the slides were placed in a series of solutions—namely 100% ethanol (EtOH) twice, 95% EtOH, 80% EtOH and deionized water at RT—for 3 min each. The slides used in this study were processed with a HIER (heat-induced epitope retrieval) procedure before the staining. The slides were placed in a 10 mM retrieval solution (10 mM sodium citrate, 0.05% Tween 20, pH 6.0) for 30 min at 95-100° C. and allowed to cool for 20 min in 1×PBS. The slices were blocked with a blocking buffer (10% normal rabbit serum, 0.2% Triton X-100, 1×PBS) for 3 h at RT, followed by overnight incubation with antibody complexes at RT, before being washed three times with the blocking buffer at RT for 30 min each.

RNA-FISH is as follows.

RNAscope (Advanced Cell Diagnostics) was conducted on NIH-3T3 cells as instructed by the manufacturer's user manual. Briefly, fixed cells were dehydrated with EtOH, and rehydrated with EtOH and 1×PBS. The rehydrated cells were digested by diluting protease III (RNAscope) in a ratio of 1:15 using 1×PBS, and then washed with 1×PBS. Before processing an RNAscope amplifier, the cells were incubated with an RNAscope probe, and washed with 1×RNAscope wash buffer. After amplification, the cells were labeled with DAPI, and washed with 1×PBS. Then, the cells were stained with the preformed antibody complexes.

Fluorophore inactivation (t-CyCIF) is as follows.

For the first straining round, an antibody complex labeling PV (indicated as CF488A) and an antibody complex labeling NeuN (indicated as ATTO0514) were used to stain a mouse brain slice. DAPI was used as a fiducial marker for the sample. After the first round of imaging, the sample stained with the fluorophores was inactivated in an inactivation buffer (4.5% $H_2O_2$ and 24 mM NaOH in 1×PBS) for 2 h at RT under a white light. Then, the sample was washed four times with 1×PBS for 1 h each, followed by a second round of staining. During the second staining, two antibody complexes, an antibody complex labelling calretinin (indicated as CF488A) and an antibody complex labelling GluT, were used in the same sample. DAPI was used again.

Signal amplification via an anti-fluorophore antibody is as follows.

All the antibodies used in this part were diluted in a ratio 1:500 with a blocking buffer (5% normal donkey serum, 0.2% Triton X-100, 1×PBS). BS-C-1 cells were incubated in the blocking buffer for permeabilization process and blocking for 1.5 h. Then, the cells were mixed with a solution containing a rabbit primary antibody labeling GM130, and then, washed three times with the blocking buffer for 5 min each. The cells were incubated with a solution containing a donkey anti-rabbit conjugated with alexa488 which is fluorophore, and washed three times with the blocking buffer for 5 min each. The cells were incubated with a solution containing a rabbit anti-alexa488, and then washed three times with the blocking buffer for 5 min each. Finally, the cells were incubated with a solution containing the same secondary antibody (donkey anti-rabbit conjugated with alexa488), and then washed three times with the blocking buffer for 5 min each. After signal amplification for the rabbit primary antibody, the cells were incubated with a solution containing a mouse anti-lamin A/C, and then washed three times with the blocking buffer for 5 min each.

Last, the cells were incubated with a solution containing a donkey anti-mouse conjugated with ATTO514, and then washed three times with the blocking buffer for 5 min.

Fluorophore brightness measurement is as follows.

The fluorophore brightness measurement was conducted in Andor spinning-disk confocal microscopy. CF405S, ATTO390, CF405L used 100 µL of a fluorophore solution. CF488A, ATTO514, ATTO490LS, CF568, ATTO Rho101, CF633, CF660R used 10 µL of the fluorophore solution. The fluorophore solution was imaged by using one of four excitation lasers (405-nm, 488-nm, 561-nm, 637-nm) in 10× an object lens.

Protein-retention expansion microscopy is as follows.

Stained samples were incubated in acryloyl-X, SE (AcX) diluted in 1×PBS overnight at RT and then washed three times for 30 min with 1×PBS. The samples were then incubated twice with a monomer solution (7.5% (w/w) sodium acrylate, 2.5% (w/w) acrylamide, 0.15% (w/w) bis-acrylamide, 1×PBS, 2 M NaCl) at 4° C. for 30 min each time. The samples were placed between two coverglasses filled with a gelation buffer (monomer solution, 0.2% (w/w) APS, 0.2% (w/w) TEMED, 0.01% (w/w) H-TEMPO) and incubated at 37° C. for 1.5 h. The gels were treated with proteinase K diluted at 1:100 in a digestion buffer (25 mM EDTA, 50 mM Tris-HCl, 0.5% Triton X-100, 1 M NaCl) at 37° C. overnight with gentle shaking. After digestion, the digested gels were placed in deionized water with gentle shaking.

SHIELD is as follows.

500 µm-thick mouse brain slices were incubated in a SHIELD-OFF solution (a mixture of DI water, SHIELD-Buffer solution, and SHIELD-Epoxy solution at a ratio of 1:1:2) at 4° C. with gentle shaking for 1 day. The samples were transferred to a mixture of SHIELD-ON buffer and SHIELD-Epoxy solution with a ratio of 7:1 and then incubated at 37° C. with gentle shaking for 6 h. The samples were incubated in the SHIELD-ON buffer at 37° C. with gentle shaking overnight. For tissue clearing, the samples were incubated in a clearing solution (300 mM sodium dodecyl sulfate, 10 mM boric acid, 100 mM sodium sulfite, pH 9.0) at 37° C. with gentle shaking for 1 day. Imaging was obtained by using 40×1.15 NA water immersion in Nikon C2 plus confocal microscopy with DUVB detector, Leica TCS SP8, and Andor Dragonly spinning-disk confocal microscopy.

Image processing is as follows.

Images obtained from the spectrum detector applied the spectral separation algorithm, and images obtained from the confocal microscopy equipped with the band-pass filter pre-processed before unmixing. For pre-processing, first, vignetting in the images was corrected using the image of a fluorescent slide. Second, ring-shaped artefacts in the images, possibly due to the interference of the excitation laser, were removed by subtracting an image taken without specimens. Third, the pixel shift due to the chromatic aberration was handled via image registration. For unmixing via MI minimization, we started with the initial estimation of $\alpha$ and measured mutual information between IMG1 and (IMG2−α×IMG1). Here, IMG1 and IMG2 are the first and second image, respectively. When measuring mutual information, two images were quantized to 3 bits to improve the speed of the joint histogram calculation. Because millions of pixels were used for the estimation of the single parameter, this quantization did not compromise the accuracy of the a estimation. We found the optimal value of a such that the a mutual information was minimized by using gradient descent. Once the optimal $a_{opt}$ was found, then IMG2−aopt× IMG1 was calculated to obtain the image of the second fluorophore. For unmixing via GS orthogonalization, $a_{GS}$ was estimated as below [Equation 12].

$$\alpha_{GS} = \frac{<\overrightarrow{IMG1}, \overrightarrow{IMG2}>}{<\overrightarrow{IMG1}, \overrightarrow{IMG1}>} \quad [\text{Equation 12}]$$

Here, <,> denotes a dot product and $\overrightarrow{IMG1}$ and $\overrightarrow{IMG2}$ are IMG1 and IMG2 rearranged as vectors, respectively. Similarly, IMG2−$\alpha_{GS}$×IMG1 was calculated to obtain the image of the second fluorophore. All image processing was conducted using custom-written MATLAB codes.

Figure 12:
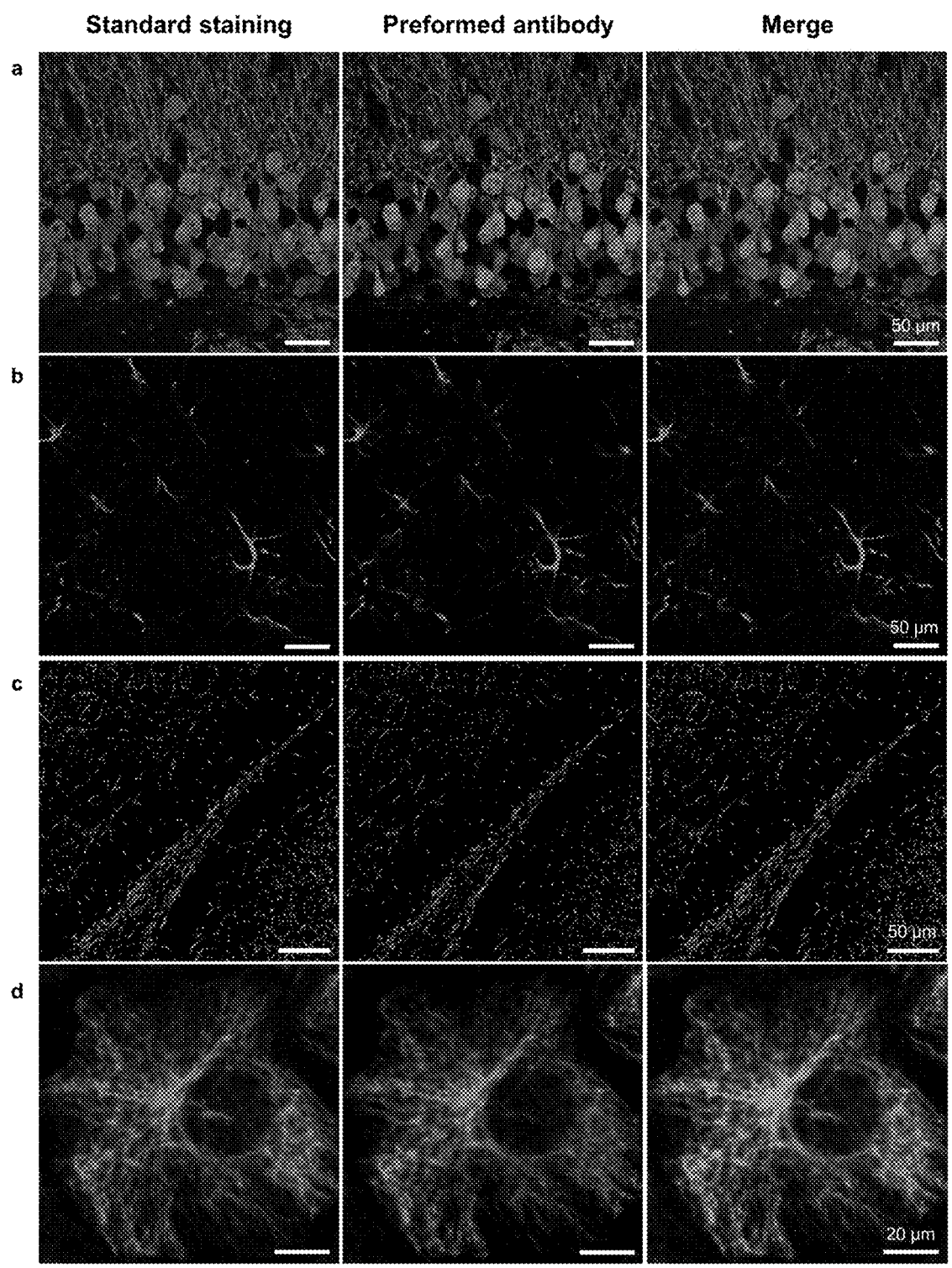
FIG. 12 is a result of validation of staining with preformed antibody complexes.

FIG. 12 is a result of validation of staining with antibody complexes.

Referring to FIG. 12, these are images of an additional experiment result of the validation of affinity and specificity of preformed antibody complexes, shown in FIG. 8a-d. The conventional antibodies and preformed antibody complexes were simultaneously stained for one target protein, and fluorescent signals were observed. From left to right, the conventional antibody staining, preformed antibody complex staining, and images merged with the two images are shown.

(a) Confocal microscopy of a Thy1-YFP mouse brain slice stained with regular antibody and preformed antibody complex against YFP. (b) Confocal microscopy images of a mouse brain slice stained with a regular antibody and preformed antibody complex against GFAP. (c) Confocal microscopy images of a mouse brain slice stained with a regular antibody and preformed antibody complex against MBP. (d) Confocal microscopy images of cultured cells stained with a regular antibody and preformed antibody complex against vimentin.

Figure 13:
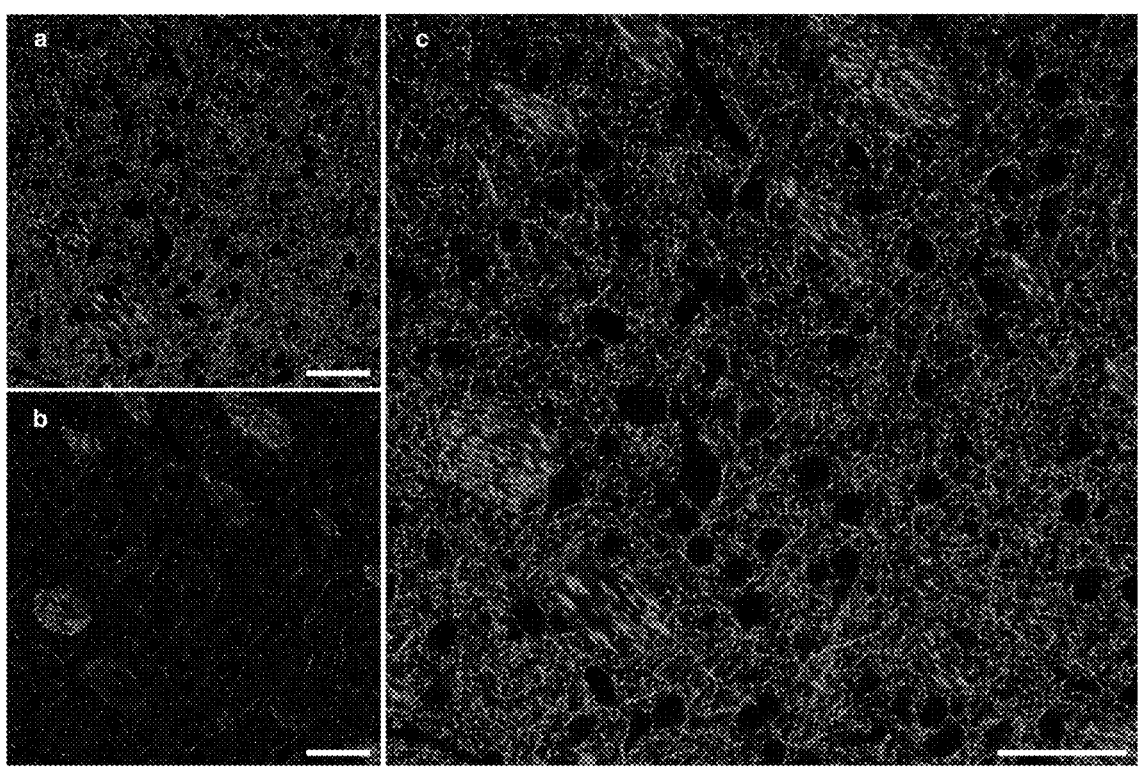
FIG. 13 is a result of validation of the absence of crosstalk between antibody complexes.

FIG. 13 is a result of validation of the absence of crosstalk between antibody complexes.

Referring to FIG. 13, these are images of an additional experiment result of the crosstalk validation shown in FIG. 8e-h. A Thy1-YFP mouse brain slice was stained with YFP antibody complex and neurofilament heavy chain (NF-H) antibody complex.

(a) YFP fluorescence. (b) CF568 fluorescence, showing NF-H. (c) Merged image of a and b. No crosstalk between the signals of the endogeneous YFP and the signals of the antibody-labelled GFAP is visible. Scale bars: 50 µm.

FIG. 14 is a result of validation of signal unmixing via mutual information minimization in a sample stained by using a preformed antibody complex.

Referring to FIG. 14, it is a result of staining a mouse brain slice with calretinin (rabbit, CF568 conjugated) antibody complex and GFAP (rabbit, ATTO Rho101 conjugated) antibody complex, and indirectly staining with GFAP (chicken, visualized by CF633) antibody.

(a) Schematic of the validation of signal unmixing. (b) Only calretinin signal was shown when excited with 557-nm in the first detection spectral range. (c) Calretinin signal and GFAP (rabbit) signal were shown when excited with 557-nm in the second detection spectral range. (d) Unmixed GFAP (rabbit) image. (e) GFAP (chicken) image obtained by indirect immunostaining. (f) Merged image of b, d, and e.

FIG. 15 is a result of validation of compatibility of the present disclosure and an expansion microscopy (ExM).

Referring to FIG. 15, these are unmixed images of an ExM-processed mouse brain slice. (a) Before unmixing. (b) After unmixing. NeuN and GFAP signals were clearly unmixed via MI minimization. (c) Before unmixing. (d) After unmixing. NF-H and GluT1 signals were clearly unmixed via MI minimization. Scale bars: 50 μm.

Figure 16:
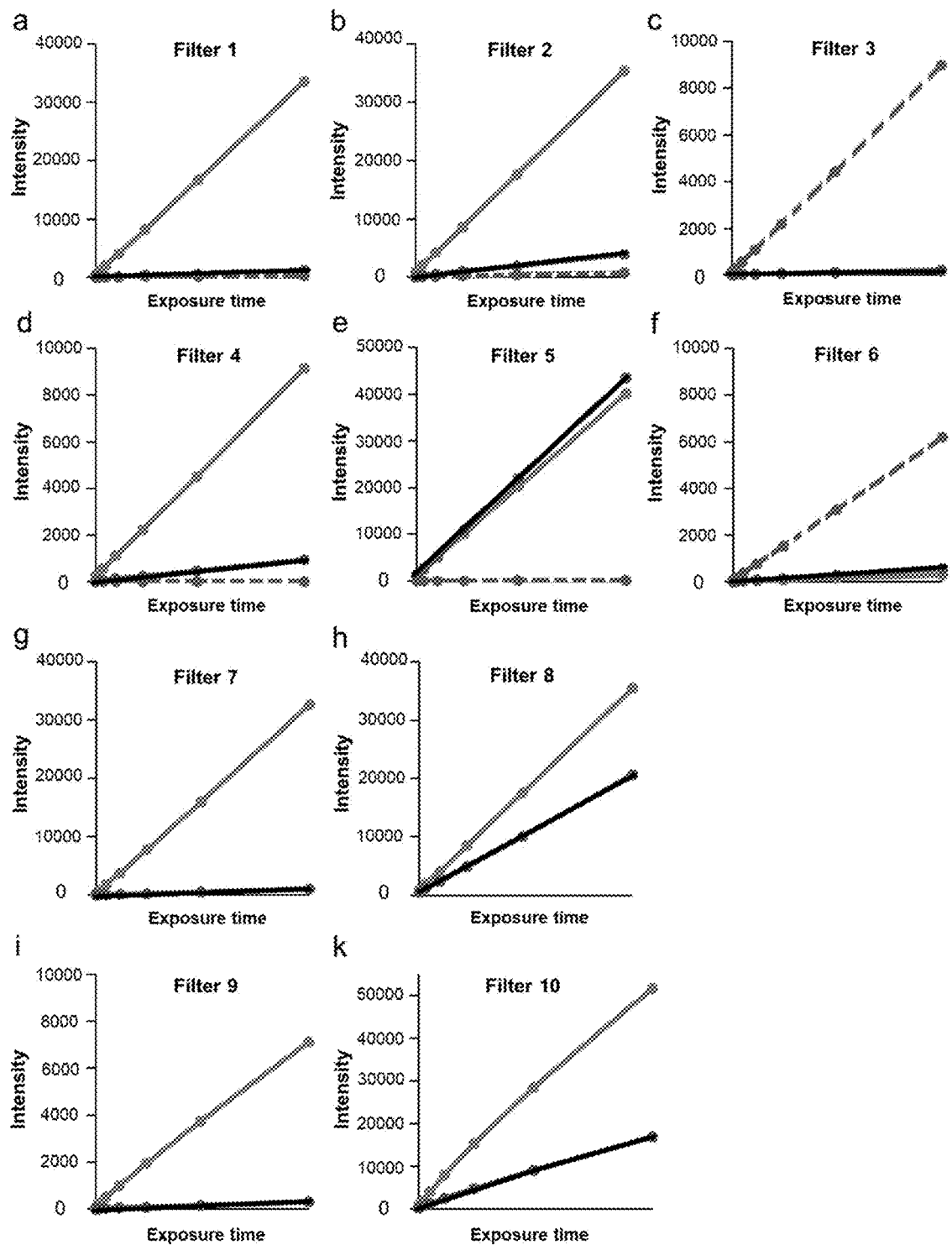
FIG. 16 is a linearity graph of signal intensity according to laser exposure time.
Figure 17:
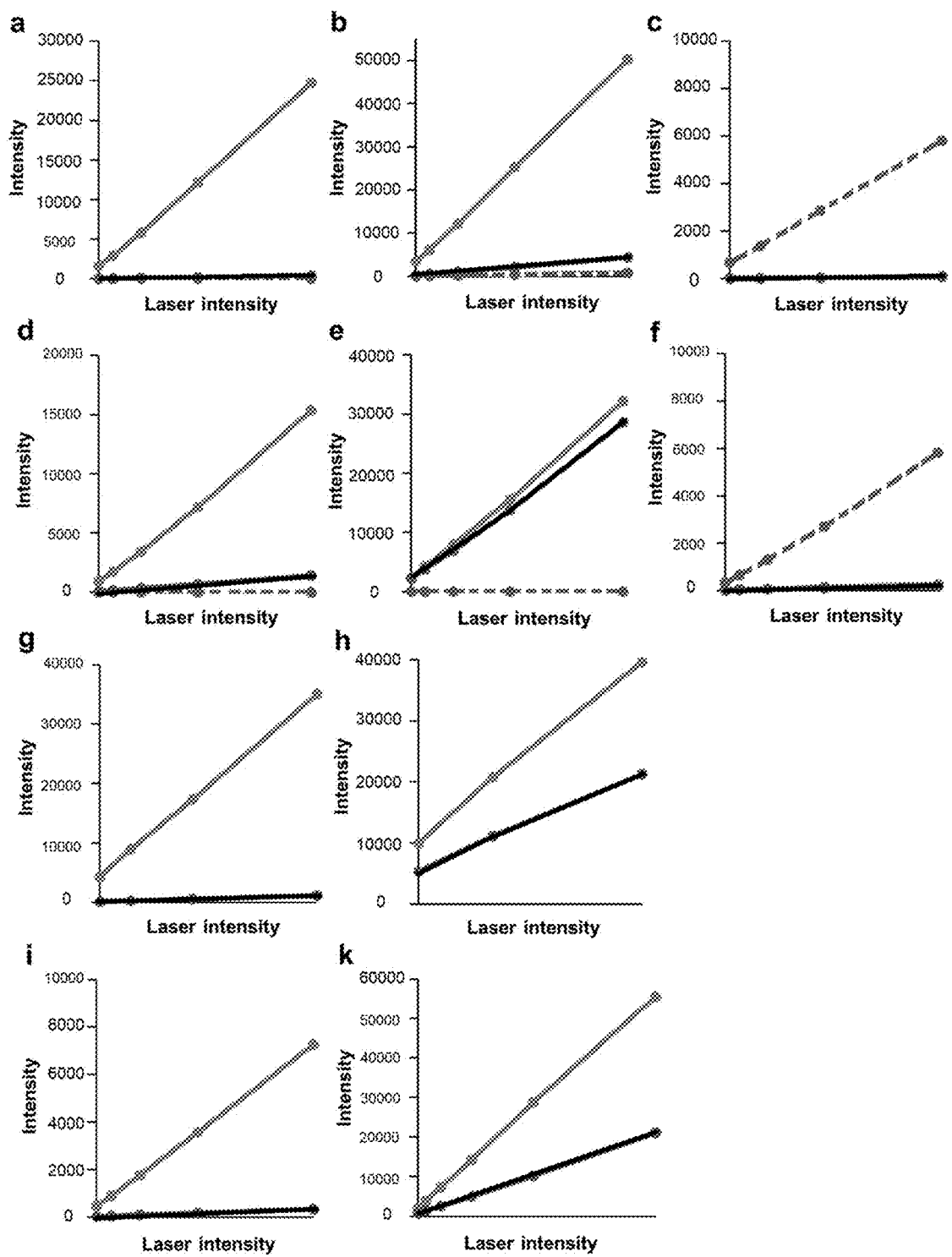
FIG. 17 is a linearity graph of signal intensity according to laser intensity.

FIG. 16 is a linearity graph of signal intensity according to laser exposure time, and FIG. 17 is a linearity graph of signal intensity according to laser intensity.

Referring to FIG. 16, brightness was measured according to laser exposure time of 10 fluorophores in Andor spinning-disk confocal microscopy by using an optimized optical filter.

(a-c) Result of measuring CF405S (grey and full line), ATTO390 (black line), and CF405L (broken line).

(d-f) Result of measuring CF488A (grey and full line), ATTO514 (black line), and ATTO490LS (broken line).

(g-h) Result of measuring CF568 (grey and full line) and ATTO Rho101 (black line).

(i-k) Result of measuring CF633 (grey, full line) and CF660R (black).

Referring to FIG. 17, brightness was measured according to laser intensity of 10 fluorophores in Andor spinning-disk confocal microscopy by using an optimized optical filter.

(a-c) Result of measuring CF405S (grey and full line), ATTO390 (black line), and CF405L (broken line).

(d-f) Result of measuring CF488A (grey and full line), ATTO514 (black line), and ATTO490LS (broken line).

(g-h) Result of measuring CF568 (grey and full line) and ATTO Rho101 (black line).

(i-k) Result of measuring CF633 (grey and full line) and CF660R (black line).

Figure 18:
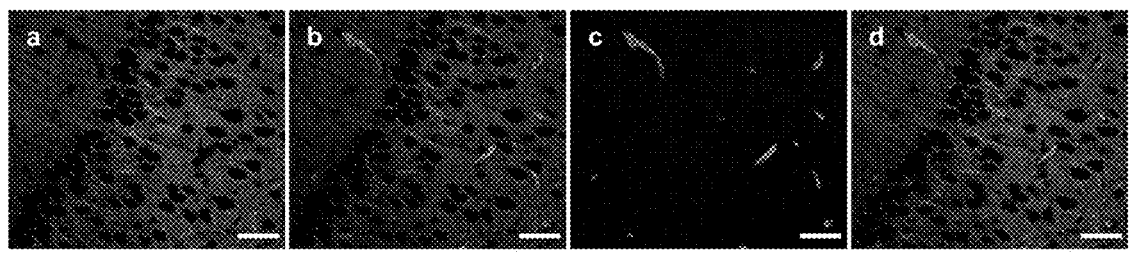
FIG. 18 is a result of signal unmixing based on fluorophore measurement.

FIG. 18 is a result of signal unmixing based on fluorophore measurement.

Referring to FIG. 18, (a-d) signal unmixing with a measured α value of CF488A, in which the value was calibrated based on laser intensity and exposure time (FIGS. 16 and 17) before unmixing. (a) SV2A. (b) Before unmixing (SV2A and GluT1). (c) After unmixing (GluT1). (d) Merged image of a and c. Scale bars: 50 μm.

FIG. 19 is a drawing for describing application of multi-round multiplexed imaging technology (t-CyCIF) of the present disclosure.

Referring to FIG. 19, (a) schematic showing how the present disclosure was combined with t-CyCIF.

(b-c) Confocal microscopy of the hippocampal region of a 150 μm-thick mouse brain slice. (b) In the first cycle, PV and NeuN were labeled with spectrally overlapping fluorophores and imaged using a 488-nm excitation laser. The acquired images were then unmixed via MI minimization. DAPI was used as a fiducial marker. (c) After dye inactivation, calretinin and GluT1 were labeled with the same spectrally overlapping fluorophores and imaged using a 488-nm excitation laser. The acquired images were then unmixed via MI minimization. DAPI was used as a fiducial marker. Scale bars: 50 μm.

Figure 20:
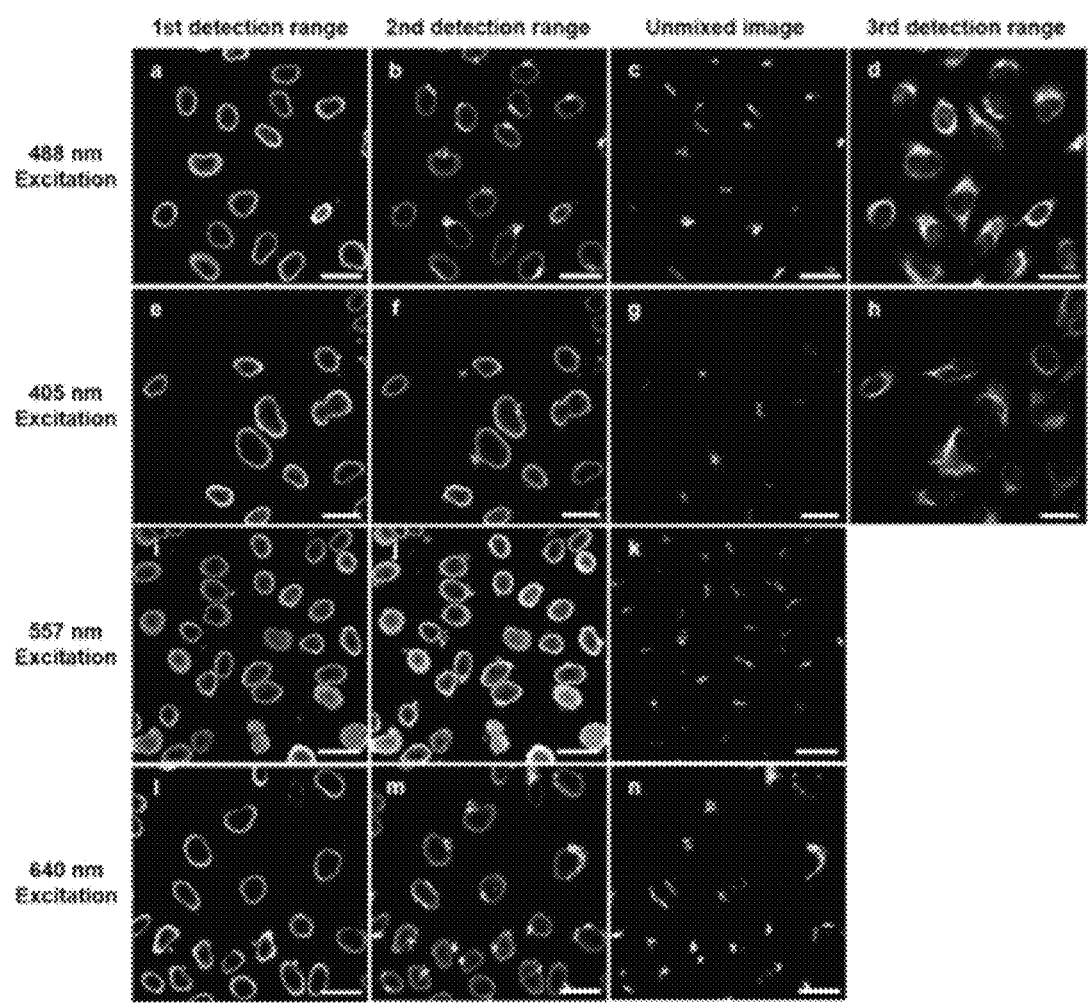
FIG. 20 is a result of signal unmixing through Gram-Schmidt orthogonalization.

FIG. 20 is a result of signal unmixing through Gram-Schmidt orthogonalization.

Referring to FIG. 20, Two- or three-colour multiplexed images unmixed via Gram-Schmidt (GS) orthogonalization. The sources of the unmixed images shown in FIG. 7e-h were unmixed a second time via GS orthogonalization. Target proteins were lamin A/C (shown in the image of the 1st detection spectral range image), GM130 (shown in the unmixed image), and vimentin (shown in the image of the 3rd detection spectral range). Scale bars: 30 μm.

The below [Table 2] is a list of primary antibodies validated that the present disclosure works.

The below [Table 3] is a list of the fluorophores that the present disclosure tested.

TABLE 2

| # | Antibody | Vendor | Catalog# | Host | Clonality |
|---|---|---|---|---|---|
| Mouse brain marker | | | | | |
| 1 | ABAT | HPA | HPA041690 | Rb | Poly |
| 2 | α-internexin/NF66 | EnCor | RPCA-α-Int | Rb | Poly |
| 3 | ARFGEF1 | HPA | HPA023822 | Rb | Poly |
| 4 | α-tubulin | Abcam | ab18251 | Rb | Poly |
| 5 | β-tubulin | Abcam | ab6046 | Rb | Poly |
| 6 | Calbindin | Abcam | ab11426 | Rb | Poly |
| 7 | CALB2 | HPA | HPA007305 | Rb | Poly |
| 8 | Calretinin | Abcam | ab702 | Rb | Poly |
| 9 | CAMK2B | HPA | HPA026307 | Rb | Poly |
| 10 | CNP1 | SYSY | 355 002 | Rb | Poly |
| 11 | DDX3X | HPA | HPA001648 | Rb | Poly |
| 12 | E1F1AX | HPA | HPA002561 | Rb | Poly |
| 13 | FGF3 | HPA | HPA012692 | Rb | Poly |
| 14 | GABA-A receptor α1 | SYSY | 224 203 | Rb | Poly |
| 15 | GAD65/67 | Millipore | AB1511 | Rb | Poly |
| 16 | GFAP | Abcam | ab7260 | Rb | Poly |
| 17 | GFAP | HPA | HPA056030 | Rb | Poly |
| 18 | GFP | Abcam | ab290 | Rb | Poly |
| 29 | GluR1 | Abcam | ab31232 | Rb | Poly |
| 20 | GPR17 | HPA | HPA029766 | Rb | Poly |
| 21 | Homer1 | SYSY | 160 003 | Rb | Poly |
| 22 | Iba1 | SYSY | 234 003 | Rb | Poly |
| 23 | INA | HPA | HPA008057 | Rb | Poly |
| 24 | LaminB1 | Abcam | ab16048 | Rb | Poly |
| 25 | Laminin | Abcam | ab11575 | Rb | Poly |
| 26 | Laminin | EnCor | RPCA-Laminin | Rb | Poly |
| 27 | LHX2 | HPA | HPA000838 | Rb | Poly |
| 28 | MAP2 | Abcam | ab32454 | Rb | Poly |
| 29 | MBP | Abcam | ab40390 | Rb | Poly |
| 30 | MBP | HPA | HPA049222 | Rb | Poly |
| 31 | MBP | Aves | MBP | Chk | Poly |
| 32 | NECAB2 | HPA | HPA013998 | Rb | Poly |
| 33 | NeuN | Millipore | ABN78 | Rb | Poly |
| 34 | Neurofilament 200 | Sigma | N4142 | Rb | Poly |
| 35 | Neurofilament-L | EnCor | RPCA-NF-L | Rb | Poly |
| 36 | Neurofilament-M | EnCor | RPCA-NF-M | Rb | Poly |
| 37 | Neurofilament-H | EnCor | RPCA-NF-H | Rb | Poly |
| 38 | Neuropeptide Y | Immunostar | 22940 | Rb | Poly |
| 39 | Parvalbumin | Abcam | ab11427 | Rb | Poly |
| 40 | Parvalbumin | Novus | NB120-11427 | Rb | Poly |
| 41 | PCP4 | HPA | HPA005792 | Rb | Poly |
| 42 | RAP1GAP | HPA | HPA001922 | Rb | Poly |
| 43 | SLC2A1 (=GluT1) | HPA | HPA031345 | Rb | Poly |
| 44 | Sox2 | SYSY | 347 003 | Rb | Poly |
| 45 | Somatostatin | HPA | HPA019472 | Rb | Poly |
| 46 | SV2A | Abcam | ab32942 | Rb | Poly |
| 47 | Synapsin 1 | Novus | NB300-104 | Rb | Poly |
| 48 | TBR1 | Abcam | ab31940 | Rb | Poly |
| 49 | TH | Abcam | ab112 | Rb | Poly |
| 50 | VAMP2 | abcam | ab3347 | Rb | Poly |
| 51 | vGluT1 | SYSY | 135 303 | Rb | Poly |
| 52 | vGluT2 | SYSY | 135 403 | Rb | Poly |
| 53 | ZNF3 | HPA | HPA003719 | Rb | Poly |
| Cell marker | | | | | |
| 54 | β-tubulin | Abcam | ab6046 | Rb | Poly |
| 55 | Clathrin heavy chain | Abcam | ab21679 | Rb | Poly |
| 56 | CollagenIV | Abcam | ab6586 | Rb | Poly |
| 57 | Fibronectin | Abcam | ab2413 | Rb | Poly |
| 58 | GM130 | Abcam | ab52649 | Rb | Mono |
| 59 | LaminB1 | Abcam | ab16048 | Rb | Poly |
| 60 | Pericentrin | Abcam | ab4448 | Rb | Poly |
| 61 | Vimentin | Abcam | ab45939 | Rb | Poly |
| Human tissue marker | | | | | |
| 62 | KRT19 | HPA | HPA002465 | Rb | Poly |
| 63 | COX IV | Abcam | ab16056 | Rb | Poly |
| 64 | Histone H3 | Abcam | ab1791 | Rb | Poly |
| 65 | Vimentin | Abcam | ab45939 | Rb | Poly |

TABLE 3

| # | Dye | Vendor | Catalog# |
|---|---|---|---|
| 1 | ATTO390 | ATTO-TEC | AD 390-31 |
| 2 | CF405S | Biotium | #92110 |
| 3 | CF405M | Biotium | #92111 |
| 4 | CF405L | Biotium | #92112 |
| 5 | Dylight405 | Life technologies | 46400 |
| 6 | ATTO430LS | ATTO-TEC | AD 430LS-31 |
| 7 | CF488A | Biotium | #92120 |
| 8 | ATTO488 | ATTO-TEC | AD 488-31 |
| 9 | Alexa488 | Life technologies | A20000 |
| 10 | ATTO490LS | ATTO-TEC | AD 490LS-31 |
| 11 | ATT0514 | ATTO-TEC | AD 514-31 |
| 12 | CF514 | Biotium | #92103 |
| 13 | ATTO532 | ATTO-TEC | AD 532-31 |
| 14 | Alexa546 | Life technologies | A20002 |
| 15 | ATTO565 | ATTO-TEC | AD 565-31 |
| 16 | CF568 | Biotium | #92131 |
| 17 | ATTO Rho101 | ATTO-TEC | AD Rho101-31 |
| 18 | Alexa594* | Jackson ImmunoResearch | 111-587-008 |
| 19 | ATTO594 | ATTO-TEC | AD 594-31 |
| 20 | ATTO633 | ATTO-TEC | AD 633-31 |
| 21 | CF633 | Biotium | #92133 |
| 22 | Alexa647* | Jackson ImmunoResearch | 111-607-008 |
| 23 | ATTO647N | ATTO-TEC | AD 647N-31 |
| 24 | Alexa680* | Jackson ImmunoResearch | 111-627-008 |
| 25 | CF660R | Biotium | #92134 |
| 26 | CF680R | Biotium | #92107 |

An operation method of the electronic apparatus 200 according to various example embodiments may include obtaining at least one image for a plurality of fluorophores labeled to different biomolecules respectively 310, and unmixing the obtained image into images for each of the biomolecules 320.

According to various example embodiments, at least two of the fluorophores may indicate emission spectra of a similar wavelength range respectively.

According to various example embodiments, the wavelength range may include a first detection spectral range corresponding to a part of one of the emission spectra, and a second detection spectral range in which at least one part of one of the emission spectra and at least one part of another of the emission spectra are overlapped. According to various example embodiments, the obtaining of the image 310 may include obtaining a first image of the first detection spectral range, and obtaining a second image of the second detection spectral range.

According to various example embodiments, the unmixing of the obtained image 320 may include obtaining a third image from the second image based on the first image.

According to various example embodiments, the first image may be detected as an image of one of the biomolecules, and the third image may be detected as an image of another of the biomolecules.

According to various example embodiments, the obtaining of the third image may obtain the third image by minimizing information shared between the first image and the second image from the second image.

According to various example embodiments, the obtaining of the third image may include estimating ratio of brightness of one of the fluorophores in the second detection spectral range to brightness of one of the fluorophores in the first detection spectral range, and obtaining the third image from the second image based on the ratio.

According to various example embodiments, the obtaining of the third image based on the ratio may include obtaining the third image by subtracting a result of multiplying the ratio and the first image from the second image.

According to various example embodiments, the obtaining of the image 310 may further include generating images of emission spectra of at least two of the fluorophores as lights of the wavelength range are illuminated to the fluorophores, and the first image and the second image may be obtained from the generated image respectively.

According to one example embodiment, the first image and the second image may be obtained by a band-pass filter respectively.

According to another example embodiment, the first image and the second image may be obtained by a spectral detector respectively.

The electronic apparatus 200 according to various example embodiments may include a memory 240, a processor 250 configured to connect with the memory, and execute at least one instruction stored in the memory 240, and the processor 250 may be configured to obtain at least one image for a plurality of fluorophores labeled to different biomolecules respectively, and unmix the obtained image into images for each of the biomolecules.

According to various example embodiments, at least two of the fluorophores may indicate emission spectra of a similar wavelength range respectively.

According to various example embodiments, the wavelength range may include a first detection spectral range corresponding to a part of one of the emission spectra, and a second detection spectral range in which at least one part of one of the emission spectra and at least one part of another of the emission spectra are overlapped.

According to various example embodiments, the processor 250 may be configured to obtain a first image of the first detection spectral range, and obtain a second image of the second detection spectral range.

According to various example embodiments, the processor 250 may be configured to obtain a third image from the second image based on the first image, detect the first image as an image of one of the biomolecules, and detect the third image as an image of another of the biomolecules.

According to various example embodiments, the processor 250 may be configured to obtain the third image by minimizing information shared between the first image and the second image from the second image.

According to various example embodiments, the processor 250 may be configured to estimate ratio of brightness of one of the fluorophores in the second detection spectral range to brightness of one of the fluorophores in the first detection spectral range, and obtain the third image from the second image based on the ratio.

According to various example embodiments, the processor 250 may be configured to obtain the third image by subtracting a result of multiplying the ratio and the first image from the second image.

According to various example embodiments, the processor 250 may be configured to generate images of emission spectra of at least two of the fluorophores as lights of the wavelength range are illuminated to the fluorophores, and obtain the first image and the second image from the generated image respectively.

According to one example embodiment, the first image and the second image may be obtained by a band-pass filter respectively.

According to one example embodiment, the first image and the second image may be obtained by a spectral detector respectively.

Various example embodiments of the present disclosure may be implemented through not only the apparatus and method but also a program performing a function corresponding to the configuration of the example embodiments of the present disclosure and a recording medium in which the program is recorded.

The example embodiments of the present disclosure were described in detailed above, but the scope of rights of the present disclosure is not limited thereto, and various modifications and improvements using the basic concept of the present disclosure defined the following claims are also included in the scope of rights of the present disclosure.

What is claimed is:

1. An operating method of an electronic apparatus, said method comprising:
obtaining at least one image for a plurality of fluorophores labeled to different biomolecules respectively and
unmixing the obtained image into images for each of the biomolecules without using previously determined, collected, measured, or stored emission spectra of the fluorophores that were used to label the biomolecules,
wherein at least two of the fluorophores indicate corresponding first and second emission spectra of similar first and second spectral ranges, respectively and
wherein unmixing the obtained image comprises inferring a ratio of brightness of one of the at least two fluorophores in the first spectral range to said brightness in the second spectral range.

2. The method of claim 1, wherein the spectral range comprises:
a first detection spectral range corresponding to a part of one of the emission spectra and
a second detection spectral range in which at least one part of one of the emission spectra and at least one part of another of the emission spectra overlap.

3. The method of claim 2, wherein obtaining the at least one image comprises: obtaining a first image, which is an image of the first detection spectral range and obtaining a second image, which is an image of the second detection spectral range.

4. The method of claim 3, wherein unmixing the obtained image comprises obtaining a third image from the second image based on the first image, wherein the first image is detected as an image of one of the biomolecule sand wherein the third image is detected as an image of another of the biomolecules.

5. The method of claim 4, wherein obtaining the third image comprises minimizing information shared between the first image and the second image.

6. The method of claim 4, wherein obtaining the third image comprises orthogonalizing the first image and the second image.

7. The method of claim 4, wherein obtaining the third image comprises: estimating a ratio of brightness of one of the fluorophores in the second detection spectral range to brightness of one of the fluorophores in the first detection spectral range and obtaining the third image from the second image based on the ratio.

8. The method of claim 7, wherein the obtaining the third image based on the ratio comprises obtaining the third image by subtracting, from the second image, a result of having multiplied the ratio and the first image.

9. The method of claim 8, wherein obtaining the image further comprises generating images of emission spectra of at least two of the fluorophores as lights of the spectral range are illuminated to the fluorophores, and wherein the first image and the second image are obtained from the generated image respectively.

10. The method of claim 9, wherein obtaining the first image and the second image comprises using a band-pass filter or a spectral detector respectively.

11. An electronic apparatus comprising:
a memory; and
a processor configured to connect with the memory and to execute at least one instruction stored in the memory;
wherein the processor is further configured to obtain at least one image for a plurality of fluorophores labeled to different biomolecules respectively and to unmix the obtained image into images for each of the biomolecules without using previously determined, collected, measured, or stored emission spectra of the fluorophores that were used to label the biomolecules and
wherein at least two of the fluorophores indicate emission spectra of a similar spectral range, respectively.

12. The apparatus of claim 11, wherein the spectral range comprises: a first detection spectral range corresponding to a part of one of the emission spectra and a second detection spectral range in which at least one part of one of the emission spectra and at least one part of another of the emission spectra overlap.

13. The apparatus of claim 12, wherein the processor is configured to obtain a first image, which is an image of the first detection spectral range and to obtain a second image, which is an image of the second detection spectral range.

14. The apparatus of claim 13, wherein the processor is configured to obtain a third image from the second image based on the first image, to detect the first image as an image of one of the biomolecules, and to detect the third image as an image of another of the biomolecules.

15. The apparatus of claim 14, wherein the processor is configured to obtain the third image by minimizing information shared between the first image and the second image.

16. The apparatus of claim 14, wherein the processor is configured to obtain the third image by orthogonalizing the first image and the second image.

17. The apparatus of claim 14, wherein the processor is configured to estimate a ratio of brightness of one of the fluorophores in the second detection spectral range to brightness of one of the fluorophores in the first detection spectral range and to obtain the third image from the second image based on the ratio.

18. The apparatus of claim 17, wherein the processor is configured to obtain the third image by subtracting, from the second image, a result of having multiplied the ratio and the first image.

19. The apparatus of claim 18, wherein the processor is configured to generate images of emission spectrum of at least two of the fluorophores as lights of the spectral range are illuminated to the fluorophores and to obtain the first image and the second image from the generated image respectively.

20. The apparatus of claim 19, wherein the first image and the second image are obtained by a band-pass filter and a spectral detector, respectively.

* * * * *